United States Patent
Hirooka

(10) Patent No.: US 10,934,920 B2
(45) Date of Patent: Mar. 2, 2021

(54) EXHAUST PURIFICATION SYSTEM FOR INTERNAL COMBUSTION ENGINE

(71) Applicant: TOYOTA JIDOSHA KABUSHIKI KAISHA, Aichi-ken (JP)

(72) Inventor: Shigemasa Hirooka, Susono (JP)

(73) Assignee: TOYOTA JIDOSHA KABUSHIKI KAISHA, Aichi-ken (JP)

( * ) Notice: Subject to any disclaimer, the term of this patent is extended or adjusted under 35 U.S.C. 154(b) by 25 days.

(21) Appl. No.: 16/289,663

(22) Filed: Mar. 1, 2019

(65) Prior Publication Data
US 2019/0271253 A1    Sep. 5, 2019

(30) Foreign Application Priority Data
Mar. 2, 2018  (JP) .............................. JP2018-037502

(51) Int. Cl.
*F01N 9/00*    (2006.01)
*B60W 10/06*  (2006.01)
(Continued)

(52) U.S. Cl.
CPC .............. *F01N 9/00* (2013.01); *B60W 10/06* (2013.01); *B60W 10/26* (2013.01); *B60W 20/16* (2016.01);
(Continued)

(58) Field of Classification Search
CPC .......... F01N 3/0814; F01N 3/10; F01N 3/101; F01N 3/2006; F01N 9/00; F01N 13/009; F01N 2240/16; F01N 2590/11; F01N 2900/0602; F01N 2900/104; B60W 10/06; B60W 10/08; B60W 10/26; B60W 20/15; B60W 20/16; B60W 2510/068; B60W 2510/244
See application file for complete search history.

(56) References Cited

U.S. PATENT DOCUMENTS

| | | | | |
|---|---|---|---|---|
| 5,353,775 A | * | 10/1994 | Yamashita | F02D 41/1494 123/686 |
| 6,892,541 B2 | * | 5/2005 | Suzuki | B60K 6/48 60/706 |

(Continued)

FOREIGN PATENT DOCUMENTS

| | | |
|---|---|---|
| JP | 2003-269208 A | 9/2003 |
| JP | 2010-32275 A | 2/2010 |

*Primary Examiner* — Audrey K Bradley
(74) *Attorney, Agent, or Firm* — Hauptman Ham, LLP

(57) ABSTRACT

Disclosed is an exhaust purification system for an internal combustion engine applied to a hybrid vehicle that performs EV travel after system power is turned on. The exhaust purification system includes: an exhaust purification catalyst; a heating element configured to generate heat with reception of power to heat the exhaust purification catalyst; a battery configured to supply the power to a motor and the heating element; a sensing unit configured to sense riding of an occupant in the hybrid vehicle; and a controller configured to execute first control to control the supply of the power from the battery to the heating element so that the power of electric energy of a prescribed ratio among activation electric energy is supplied to the heating element when the riding of the occupant is sensed by the sensing unit and a storage amount of the battery is larger than a second storage amount.

15 Claims, 12 Drawing Sheets

(51) Int. Cl.
  *B60W 10/26* (2006.01)
  *B60W 20/16* (2016.01)
  *F01N 3/20* (2006.01)

(52) U.S. Cl.
  CPC ..... *F01N 3/2006* (2013.01); *B60W 2510/244* (2013.01); *F01N 2240/16* (2013.01); *F01N 2590/11* (2013.01); *F01N 2900/104* (2013.01)

(56) References Cited

U.S. PATENT DOCUMENTS

| | | | |
|---|---|---|---|
| 2003/0172643 A1 | 9/2003 | Suzuki | |
| 2011/0047981 A1* | 3/2011 | Roos | F01N 3/2026 60/286 |
| 2018/0291784 A1* | 10/2018 | Achenback | F01N 9/00 |
| 2018/0291827 A1* | 10/2018 | Disaro' | F02B 37/04 |
| 2020/0116061 A1* | 4/2020 | Hupfeld | F01N 1/14 |

* cited by examiner

[Fig. 1]
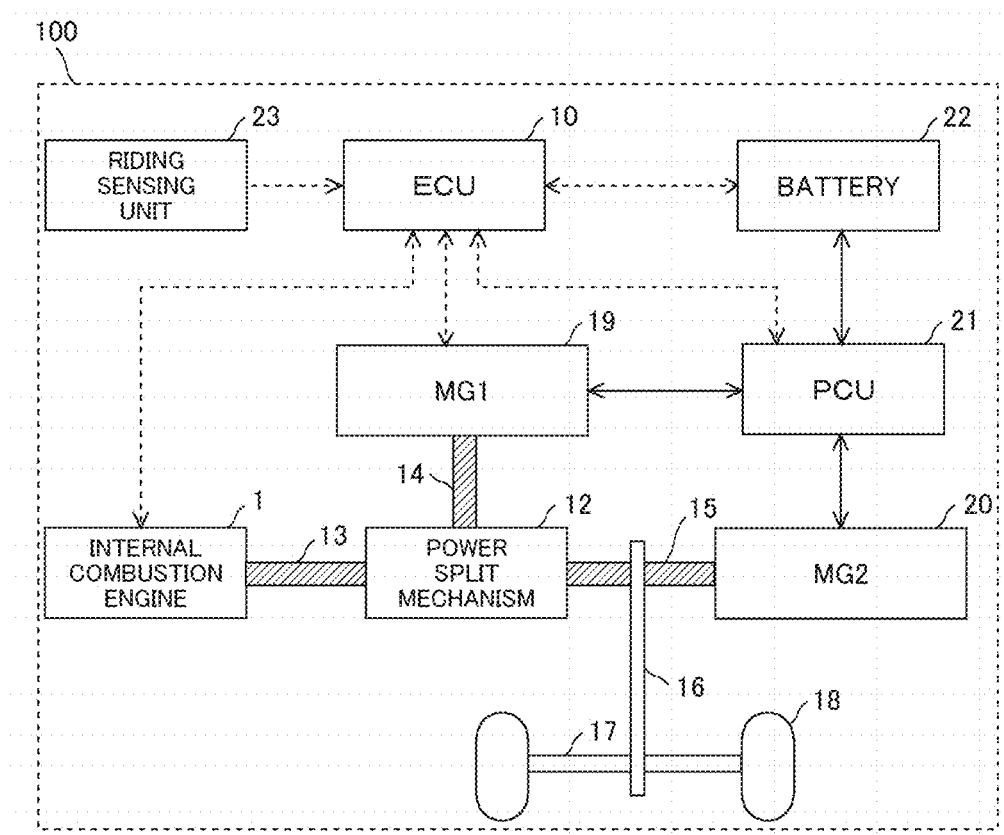

[Fig. 2]
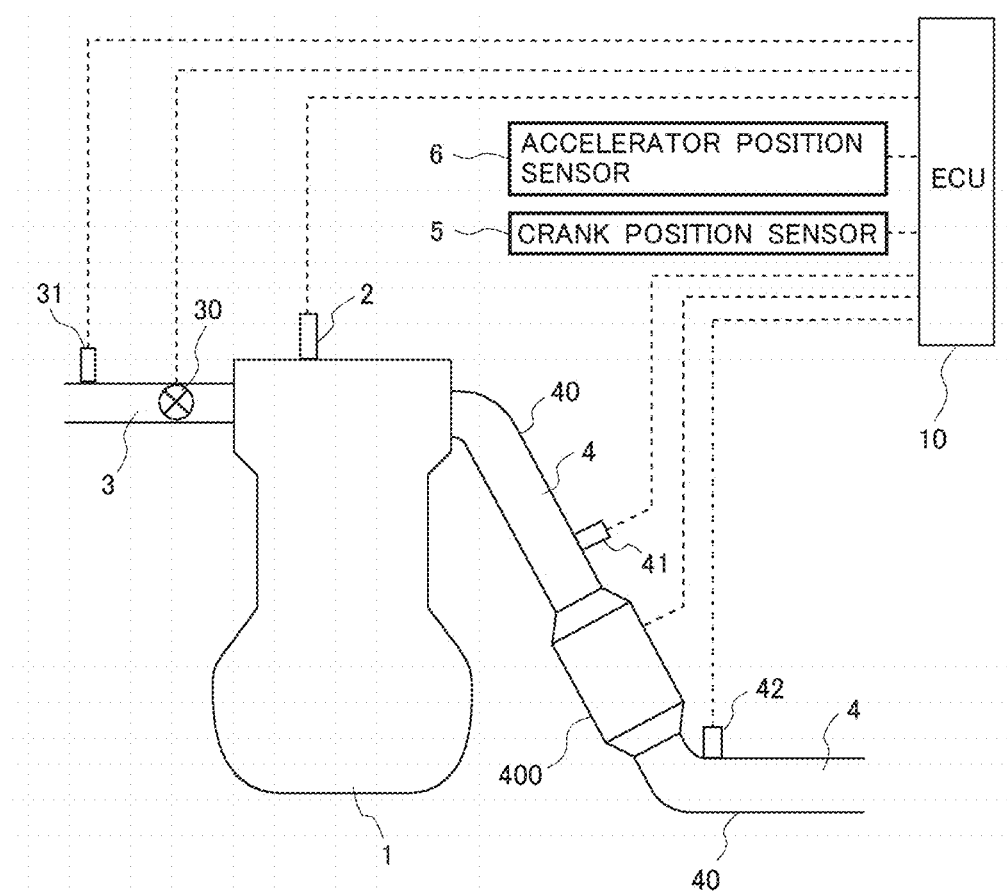

[Fig. 3]
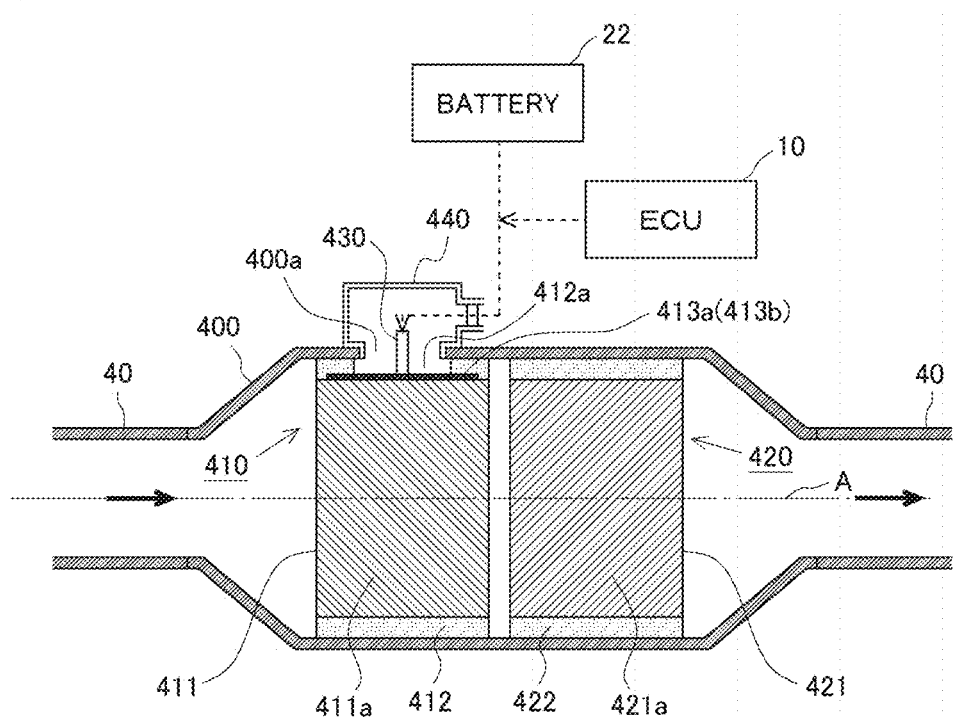

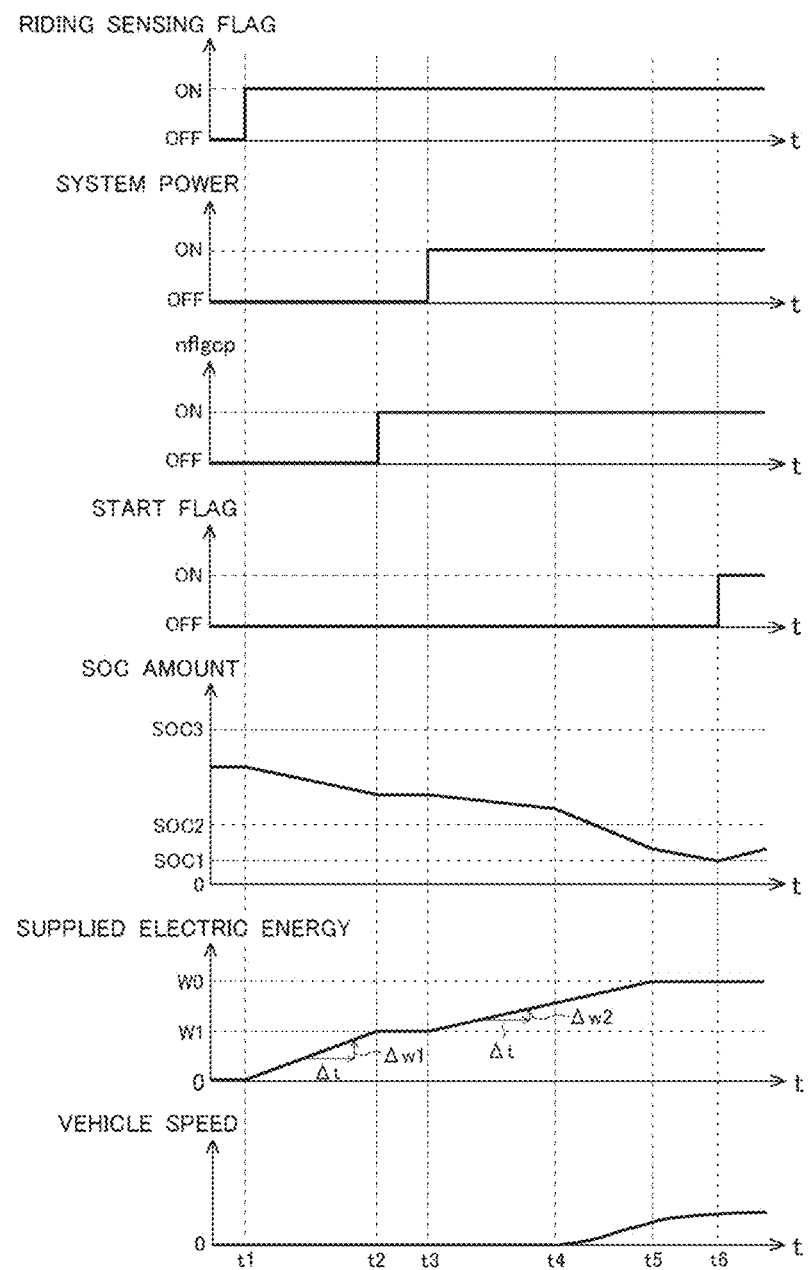
[Fig. 4]

[Fig. 5]
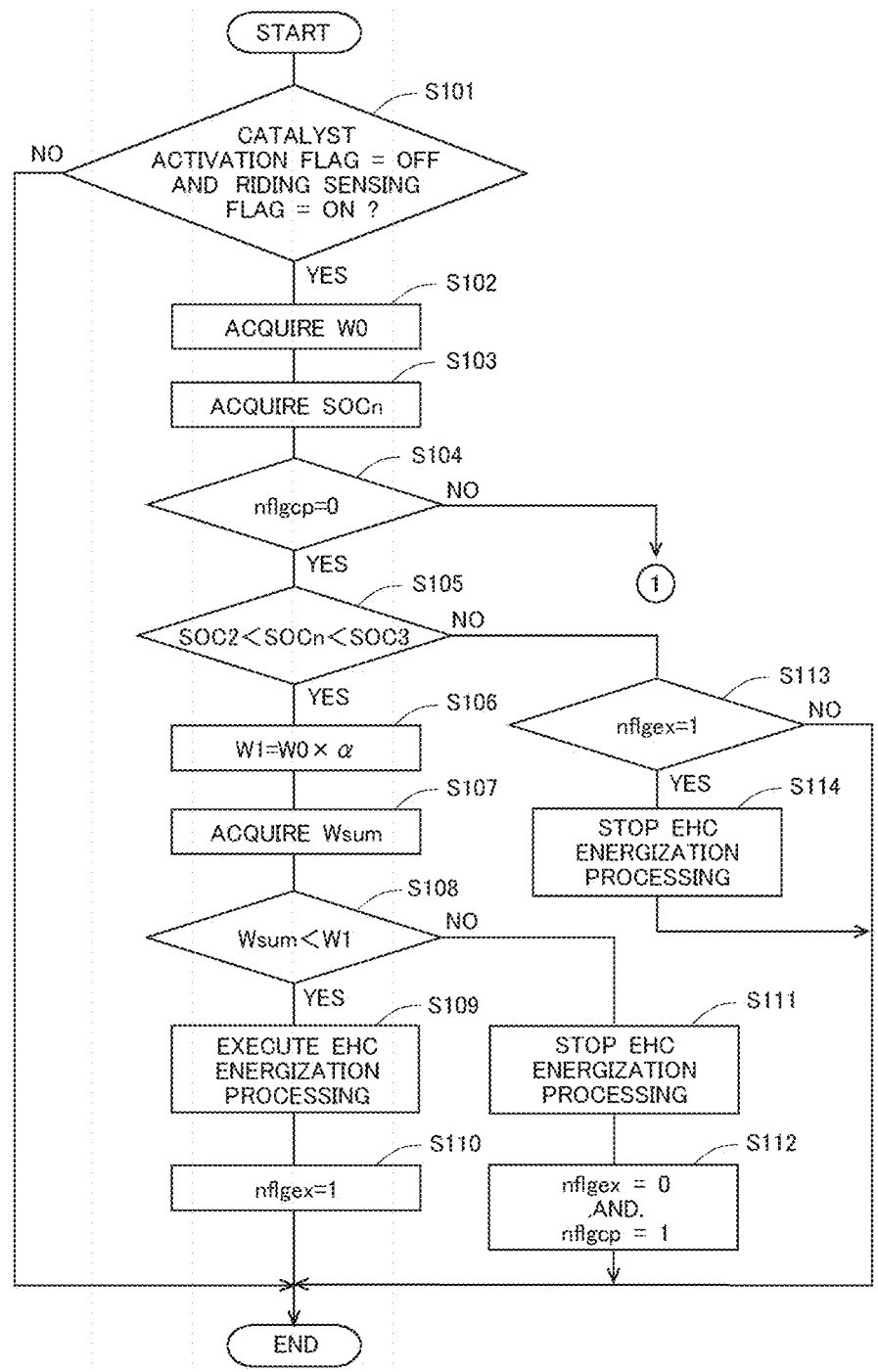

[Fig. 6]
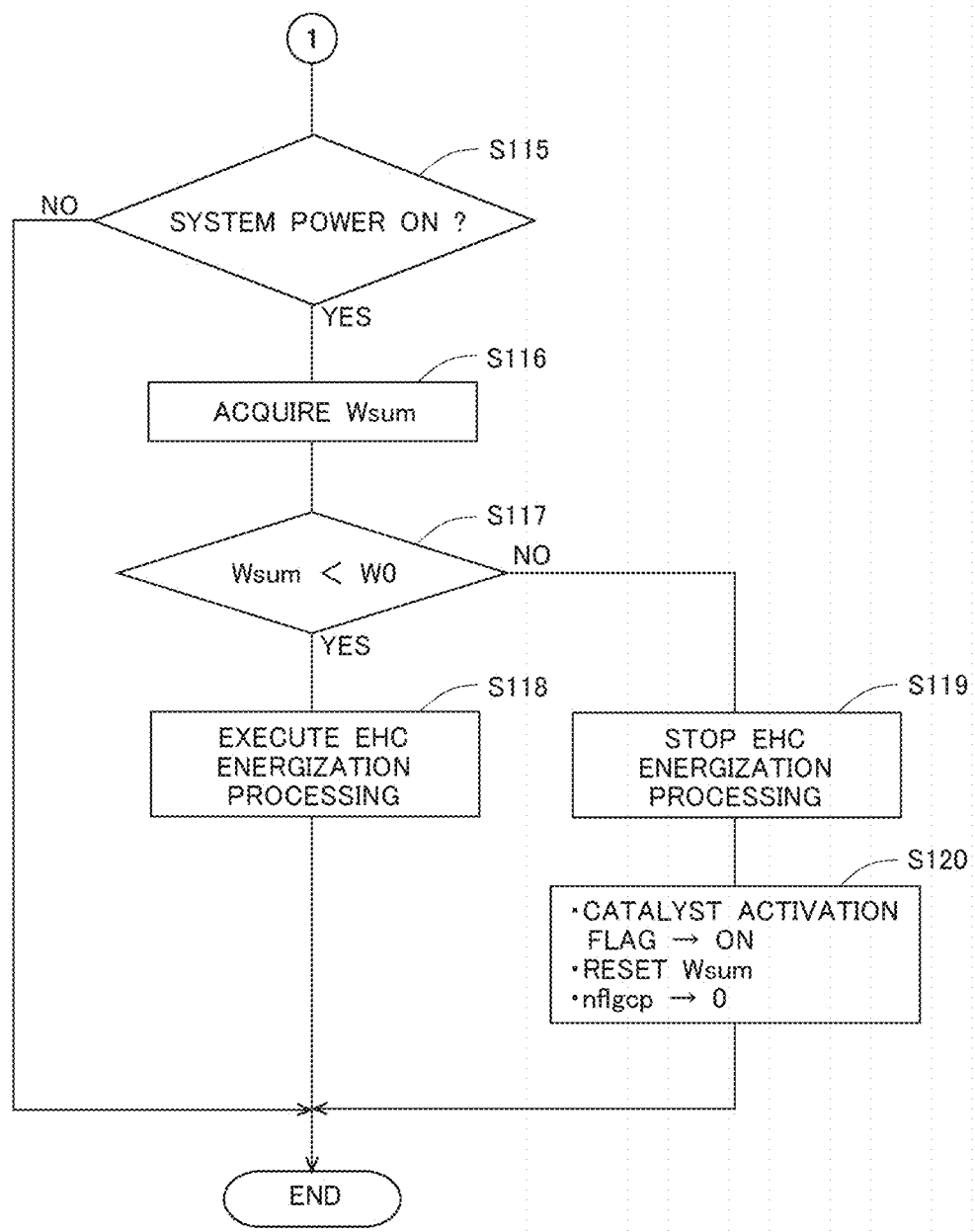

[Fig. 7]
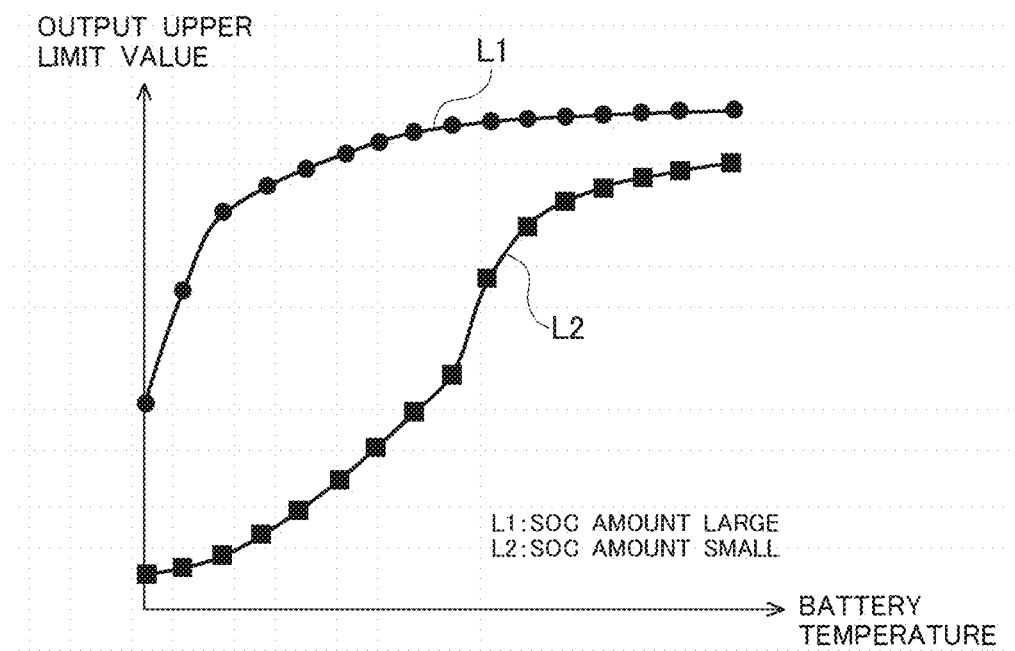

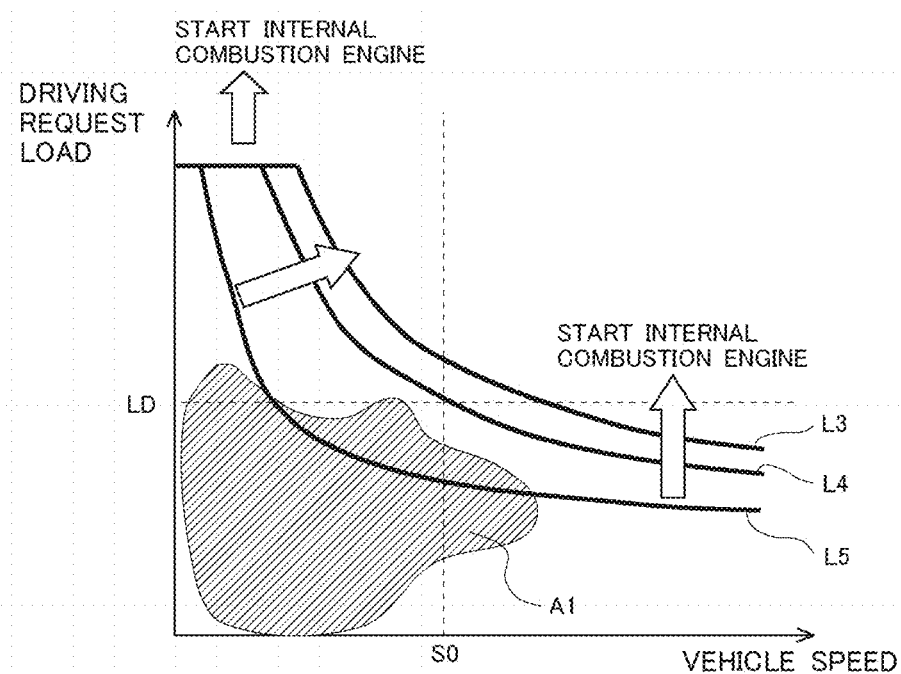
[Fig. 8]

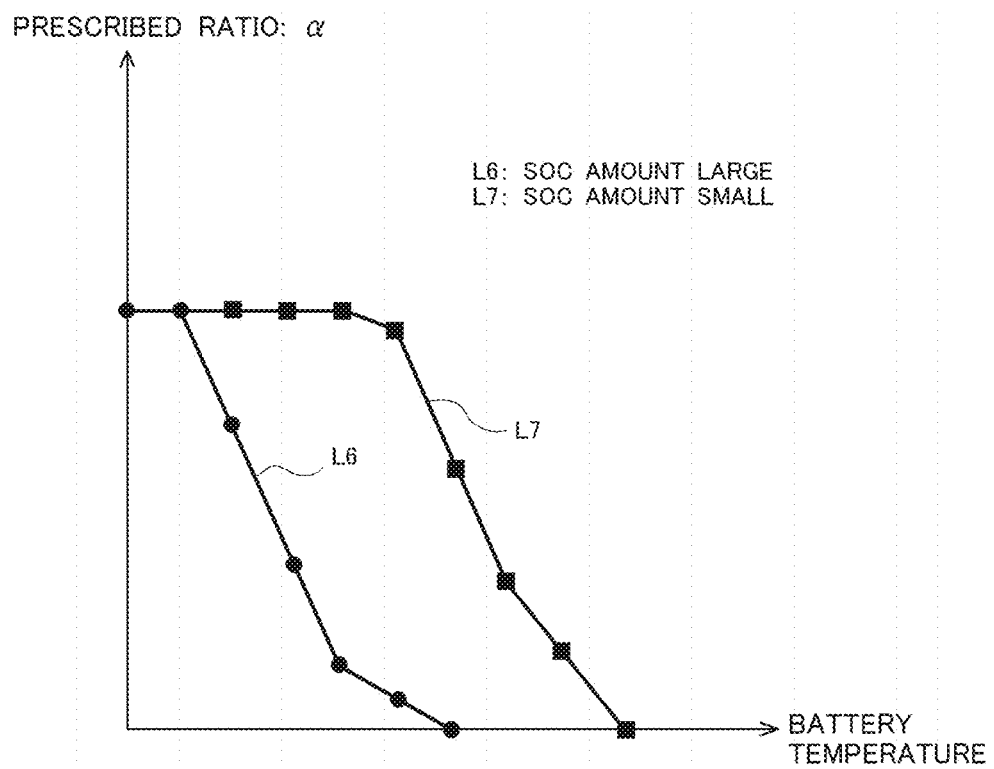
[Fig. 9]

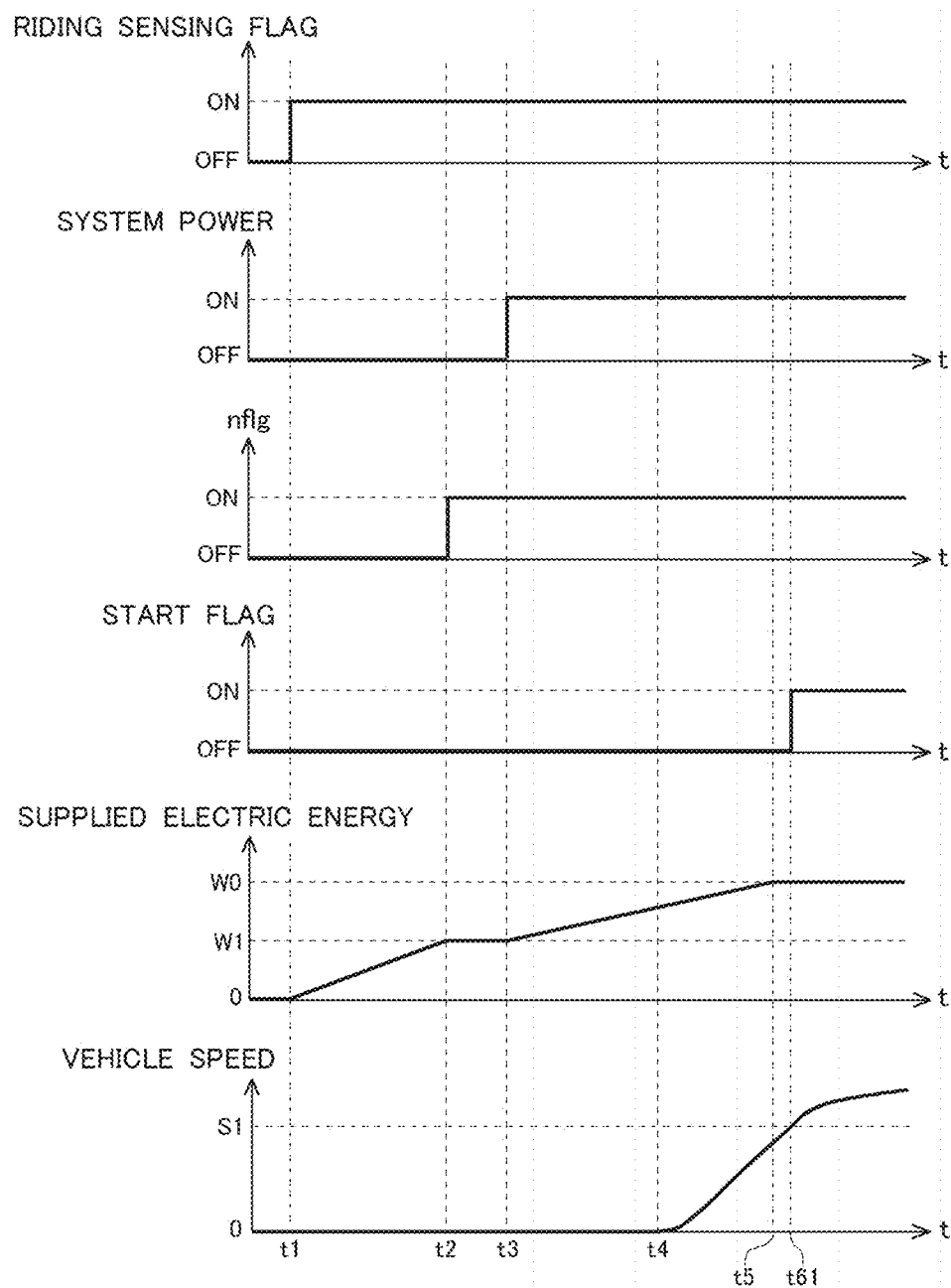
[Fig. 10A]

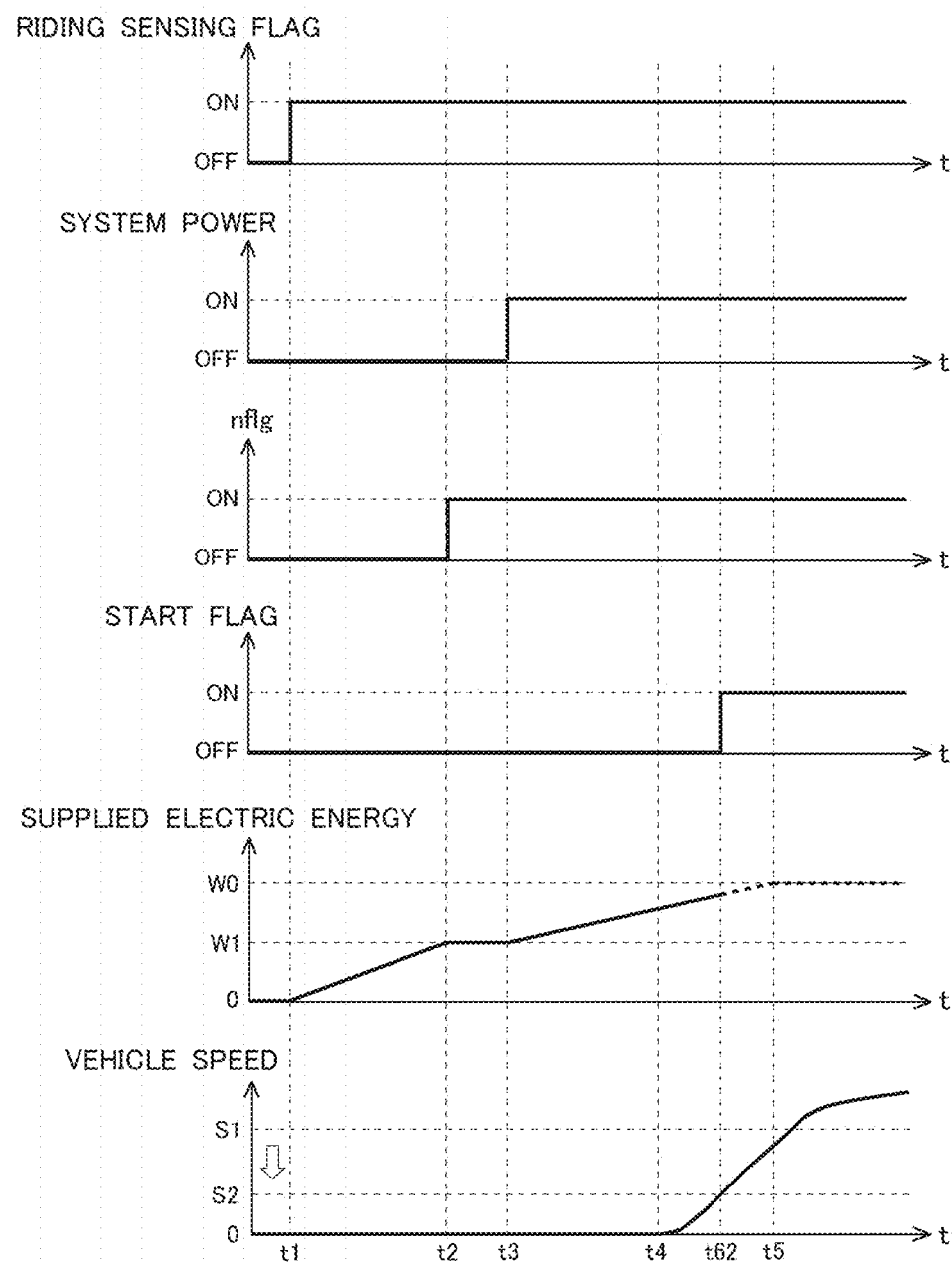
[Fig. 10B]

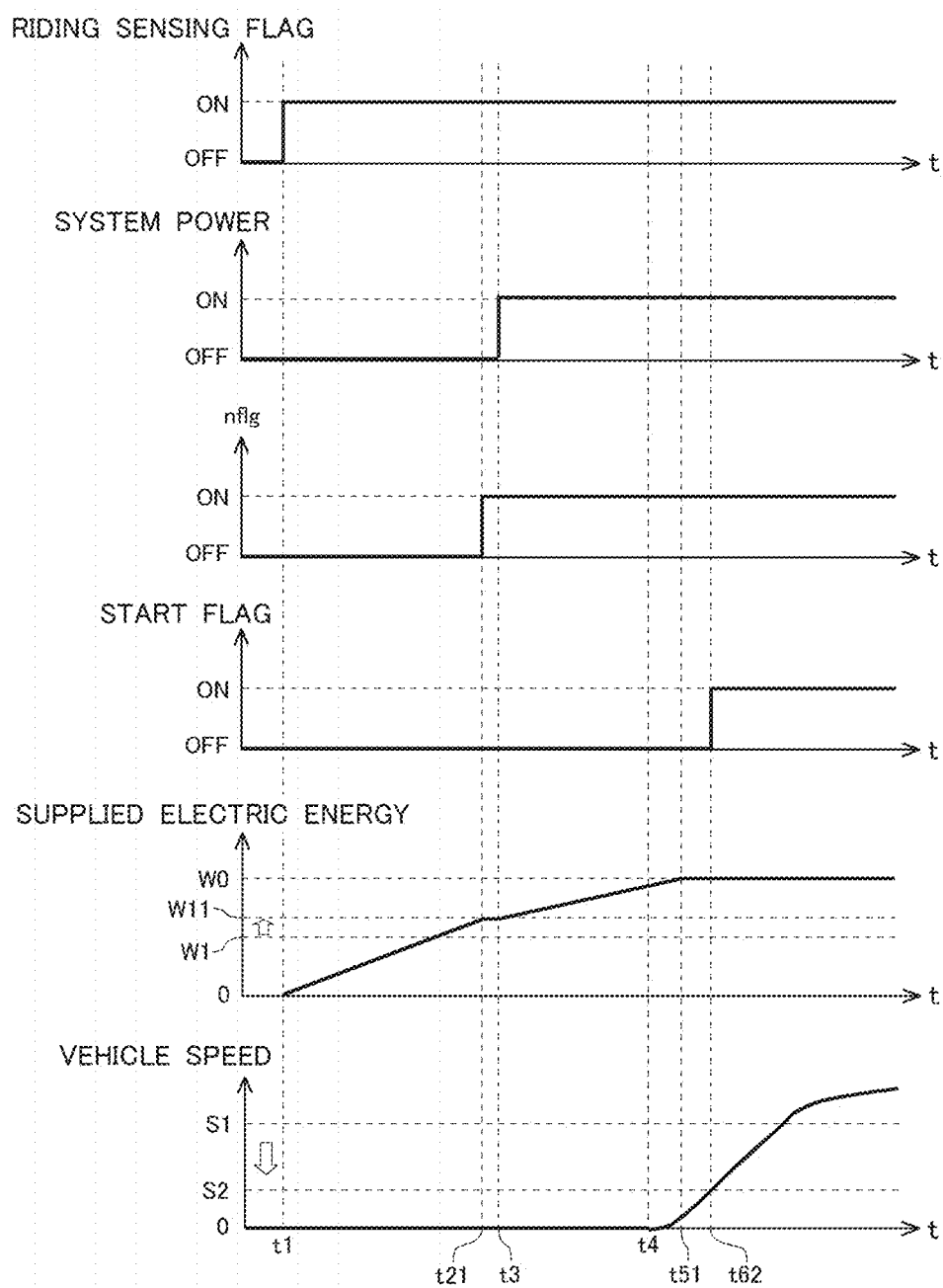

EXHAUST PURIFICATION SYSTEM FOR INTERNAL COMBUSTION ENGINE

CROSS-REFERENCE TO RELATED APPLICATIONS

This application claims the benefit of Japanese Patent Application No. 2018-037502, filed on Mar. 2, 2018, which is hereby incorporated by reference herein in its entirety.

BACKGROUND

Technical Field

The present disclosure relates to the exhaust purification system for an internal combustion engine.

Description of the Related Art

There has been known a technology (see, for example, Patent Literature 1) in which an exhaust purification catalyst or the like is preheated, when a hybrid vehicle including an internal combustion engine and a motor is travelling with the driving force of the motor (EV travel), if a storage amount of a battery that supplies power to a motor becomes a setting amount larger than a prescribed lower limit amount at which the battery is charged by the driving force of the internal combustion engine.

In addition, Patent Literature 2 discloses a technology in which a control unit that controls preheating of an air-fuel control sensor controls the heater of the air-fuel ratio sensor so that the temperature of the cover of the air-fuel ratio sensor becomes a dew point or more when sensing the riding of a driver in a vehicle.

CITATION LIST

Patent Literature

Patent Literature 1: Japanese Patent Application Laid-Open No. 2003-269208
Patent Literature 2: Japanese Patent Application Laid-Open No. 2010-032275

SUMMARY

When an exhaust purification catalyst is electrically heated in advance during EV travel in which an internal combustion engine has not been started, the activation of the exhaust purification catalyst is allowed before the starting of the internal combustion engine. Thus, emission during the starting of the internal combustion engine may be reduced.

Here, it takes certain time to electrically heat the exhaust purification catalyst to activate the same. If the time (time required to activate the exhaust purification catalyst) is not taken into consideration, a situation in which the internal combustion engine is started before the activation of the exhaust purification catalyst may occur. This is because the internal combustion engine is started when a storage amount of a battery reduces down to a prescribed lower limit amount regardless of whether the exhaust purification catalyst has been activated during the EV travel of a vehicle. Here, according to the related art described in Patent Literature 1, the time required to activate the exhaust purification catalyst is not taken into consideration. Therefore, according to the related art described in Patent Literature 1, a situation in which the internal combustion engine is started before the activation of the exhaust purification catalyst may occur.

On the other hand, according to the related art described in Patent Literature 2, time required to preheat the air-fuel ratio sensor is easily secured since the air-fuel ratio sensor is preheated when the riding of the driver in the vehicle is sensed, that is, the air-fuel ratio sensor is preheated before the travel of the vehicle is started. Accordingly, in the activation of an exhaust purification catalyst, time required to activate the exhaust purification catalyst is easily secured in such a manner that electric heating for the exhaust purification catalyst is started when the riding of the driver in the vehicle is sensed, whereby it is expected to prevent a situation in which an internal combustion engine is started before the activation of the exhaust purification catalyst as soon as possible.

However, even if the riding of the driver in the vehicle is sensed, the internal combustion engine is not necessarily immediately started afterwards. Therefore, if the internal combustion engine is not started for a relatively long period after the activation of the exhaust purification catalyst, the temperature of the exhaust purification catalyst reduces, whereby power consumed to activate the exhaust purification catalyst is wasted. Further, the power required to activate the exhaust purification catalyst is larger than power required to preheat the air-fuel ratio sensor. Accordingly, when the exhaust purification catalyst is activated in a situation in which the above waste of the power consumption occurs, wasted power consumption becomes larger compared to a case in which the air-fuel ratio sensor is preheated.

The present disclosure has been made in view of the above problems and has an object of achieving both a reduction in emission and a reduction in power consumption in an exhaust purification system in which an exhaust purification catalyst is electrically heated.

The exhaust purification system for an internal combustion engine according to the present disclosure is applied to a hybrid vehicle which includes an internal combustion engine and a motor, and which is capable of performing EV travel to travel on a driving force of the motor with the internal combustion engine stopped. For example, the hybrid vehicle performs the EV travel after system power for driving the hybrid vehicle is turned on. Furthermore, the hybrid vehicle performs the EV travel when a storage amount of a battery is larger than a first storage amount. Accordingly, when the system power is turned on and the travel of the vehicle is started, the storage amount of the battery is made larger than the first storage amount in the above hybrid vehicle.

In order to solve the above problems, the exhaust purification system for the internal combustion engine according to the present disclosure includes: an exhaust purification catalyst that is provided in an exhaust path of the internal combustion engine and purifies a prescribed component contained in exhaust of the internal combustion engine; a heating element that is provided in the exhaust path and generates heat with reception of power to heat the exhaust purification catalyst; a battery configured to supply the power to the motor and the heating element; a sensing unit configured to sense riding of an occupant in the hybrid vehicle; and a controller comprising at least one processor. The controller is configured to execute, when a storage amount of the battery where the battery is requested to be charged by a driving force of the internal combustion engine is a first storage amount and a storage amount obtained by adding a prescribed margin to the first storage amount is a second storage amount, first control to control the supply of the power from the battery to the heating element so that the power of electric energy of a prescribed ratio among activation electric energy, which represents electric energy required to activate the exhaust purification catalyst using the heating element, is supplied to the heating element when the riding of the occupant is sensed by the sensing unit and the storage amount of the battery is larger than the second storage amount.

In the exhaust purification system for the internal combustion engine, the exhaust purification catalyst may be electrically heated using the heating element when the vehicle performs the EV travel after the system power is turned on. Then, when the power of the activation electric energy is supplied to the heating element until the storage amount of the battery reduces down to the first storage amount and the internal combustion engine is started, the exhaust purification catalyst may be activated before the starting of the internal combustion engine. Thus, emission during the starting of the internal combustion engine may be reduced.

Here, the battery supplies the power not only to the motor but also to the heating element. When the vehicle performs the EV travel, electric energy taken out from the battery easily increases. Therefore, if the power has been supplied from the battery to the heating element during the EV travel of the vehicle and the supply of the power to the heating element has been insufficient, there is a likelihood that the storage amount of the battery reduces down to the first storage amount before the activation of the exhaust purification catalyst and the internal combustion engine is started. As a result, there is a likelihood of emission being degraded during the starting of the internal combustion engine.

Therefore, the controller of the exhaust purification system for the internal combustion engine according to the present disclosure performs the first control so that the power of the electric energy of the prescribed ratio among the activation electric energy is supplied to the heating element when the riding of the occupant is sensed by the sensing unit and the storage amount of the battery is larger than the second storage amount. Here, the prescribed ratio may be a value larger than 0% and smaller than 100%, may be a fixed value, or may be changed according to a state of the battery. Then, when the electric energy supplied to the heating element is controlled as described above in the first control, wasted electric energy becomes smaller compared to a case in which the power of the activation electric energy is supplied to the heating element even if the internal combustion engine is not started for a relatively long period although the power is supplied to the heating element and a situation in which the supplied power is wasted occurs. In this case, it becomes possible to reduce power consumed to activate the exhaust purification catalyst.

In addition, according to the first control, the electric heating of the exhaust purification catalyst is started when the riding of the occupant is sensed even before the EV travel of the vehicle. Then, when the execution of the first control is completed and the exhaust purification catalyst is electrically heated so that the exhaust purification catalyst is activated during the EV travel of the vehicle, time for activating the exhaust purification catalyst may be secured since the exhaust purification catalyst is electrically heated by the first control before the EV travel of the vehicle. Thus, a situation in which the internal combustion engine is started before the activation of the exhaust purification catalyst is prevented as soon as possible. As a result, it becomes possible to reduce emission during the starting of the internal combustion engine.

Note that the first control is executed when the storage amount of the battery is larger than the second storage amount. Therefore, when the storage amount of the battery reduces down to the second storage amount during the execution of the first control, the execution of the first control is stopped. On this occasion, a storage amount obtained by adding a prescribed margin to the first storage amount remains in the battery. Therefore, it becomes possible to cause the vehicle to perform the EV travel or supply the power to the heating element using the storage amount of the prescribed margin.

As described above, the exhaust purification system for the internal combustion engine according to the present disclosure reduces emission during the starting of the internal combustion engine while reducing power consumed to activate the exhaust purification catalyst. That is, according to the exhaust purification system for the internal combustion engine according to the present disclosure, both a reduction in emission and a reduction in power consumption may be achieved.

When a storage amount of the battery enough to allow the exhaust purification catalyst to be activated even if the supply of the power from the battery to the heating element is started during the EV travel of the hybrid vehicle is a third storage amount, the controller may execute the first control if the riding of the occupant is sensed by the sensing unit and the storage amount of the battery is larger than the second storage amount and smaller than the third storage amount, and may not execute the first control if the riding of the occupant is sensed by the sensing unit and the storage amount of the battery is the third storage amount or more.

Here, when the storage amount of the battery is the third storage amount or more, time for activating the exhaust purification catalyst may be secured in such a manner that the supply of the power from the battery to the heating element is started during the EV travel of the vehicle even if the execution of the first control is not started before the EV travel of the vehicle. Accordingly, even if the riding of the occupant is sensed by the sensing unit, the first control is not executed when the storage amount of the battery is the third storage amount or more. When the execution of the first control is started before the EV travel of the vehicle although the storage amount of the battery is the third storage amount or more, power supplied to the heating element is wasted if the vehicle does not travel afterwards. That is, before the EV travel of the vehicle, the execution of the first control is started when the storage amount of the battery is (larger than the second storage amount and) smaller than the third storage amount, whereby it becomes possible to reduce power consumed to activate the exhaust purification catalyst.

Here, in the hybrid vehicle to which the exhaust purification system for the internal combustion engine according to the present disclosure is applied, the internal combustion engine is started when the storage amount of the battery reduces down to the first storage amount. Meanwhile, in the hybrid vehicle, the internal combustion engine is also started when a driving request load for the vehicle becomes larger than a prescribed load. Note that the prescribed load may be a load corresponding to the upper limit value (output upper limit value) of power capable of being output per unit time by the battery. That is, when the driving request load for the vehicle is larger than the prescribed load, the internal combustion engine is started since the driving request load is not satisfied even if the power of the output upper limit value is supplied from the battery to the motor.

Then, the output upper limit value of the battery tends to be restricted to be lower when the temperature of the battery is low compared to when the temperature of the battery is high. Accordingly, in the hybrid vehicle, the prescribed load is made smaller when the temperature of the battery is low compared to when the temperature of the battery is high. Thus, the internal combustion engine is easily started when the temperature of the battery is relatively low.

Therefore, the controller may make the prescribed ratio larger to execute the first control when the temperature of the battery is low compared to when the temperature of the battery is high. Thus, the lower the temperature of the battery, the larger the electric energy supplied to the heating element before the EV travel of the vehicle easily becomes. In addition, the lower the temperature of the battery, the easier the starting of the internal combustion engine becomes as described above. Therefore, by the execution of the first control as described above, a situation in which the internal combustion engine is started before the activation of the exhaust purification catalyst is prevented as soon as possible.

According to the first control, the higher the temperature of the battery, the smaller the electric energy supplied to the heating element before the EV travel of the vehicle easily becomes. Further, the higher the temperature of the battery, the harder the starting of the internal combustion engine becomes. Therefore, the time for activating the exhaust purification catalyst is easily secured during the EV travel of the vehicle. That is, when the time for activating the exhaust purification catalyst is easily secured during the EV travel of the vehicle, the electric energy supplied to the heating element before the EV travel of the vehicle tends to be reduced. Therefore, even if the execution of the first control is started before the EV travel of the vehicle and the vehicle does not travel afterwards, wasted power consumption becomes relatively small. As described above, according to the first control, it becomes possible to reduce the power consumed to activate the exhaust purification catalyst.

On the other hand, the output upper limit value of the battery may be changed depending on the storage amount of the battery. Specifically, the output upper limit value tends to be restricted to be lower when the storage amount of the battery is small compared to when the storage amount of the battery is large. Accordingly, in the hybrid vehicle in which the internal combustion engine is started when a driving request load for the vehicle is larger than a prescribed load, the prescribed load is made smaller when the storage amount of the battery is small compared to when the storage amount of the battery is large. Thus, the internal combustion engine is easily started even when the storage amount of the battery is relatively small.

Therefore, the controller may make the prescribed ratio larger to execute the first control when the storage amount of the battery is small compared to when the storage amount of the battery is large. Thus, both a reduction in emission and a reduction in power consumption may be also achieved.

In the exhaust purification system for the internal combustion engine described above, the controller may be further configured to execute second control in which the supply of the power from the battery to the heating element is controlled so that power of electric energy obtained by subtracting electric energy supplied by the first control from the activation electric energy is supplied to the heating element when the execution of the first control is completed and the system power is turned on. And, the controller may make supplied electric power per unit time in the first control made larger than supplied electric power per unit time in the second control.

Here, when the system power for driving the hybrid vehicle is turned on, the vehicle has a high probability of relatively quickly starting the EV travel afterwards. That is, the second control tends to be executed during the EV travel of the vehicle. Then, the internal combustion engine is easily started when the battery supplies power to both the heating element and the motor compared to when the power is supplied only to the heating element. This is because the battery is requested to produce a large output when the power is supplied to both the heating element and the motor and the internal combustion engine is started when the driving request load for the vehicle becomes larger than a prescribed load as described above.

According to the exhaust purification system, the supplied electric power for the heating element per unit time in the first control is made larger than the supplied electric power for the heating element per unit time in the second control. That is, the supplied electric power for the heating element per unit time is made smaller in the second control in which the battery is requested to produce a relatively large output and the internal combustion engine is easily started, while the supplied electric power for the heating element per unit time is made larger in the first control in which the battery is requested to produce a relatively small output and the internal combustion engine is not easily started. Thus, a situation in which the internal combustion engine is started before the activation of the exhaust purification catalyst may be suitably prevented.

According to the present disclosure, both a reduction in emission and a reduction in power consumption may be achieved in an exhaust purification system in which an exhaust purification catalyst is electrically heated.

BRIEF DESCRIPTION OF DRAWINGS

FIG. 1 is a diagram illustrating the schematic configuration of a vehicle according to an embodiment of the present embodiment;

FIG. 2 is a diagram illustrating the schematic configuration of an internal combustion engine according to the embodiment of the present disclosure;

FIG. 3 is a diagram illustrating the schematic configuration of an exhaust purification unit according the embodiment of the present disclosure;

FIG. 4 is a time chart illustrating the temporal transitions of a riding sensing flag, system power, a first-control complete flag, a start flag, a SOC amount, supplied electric energy, and a vehicle speed when control according to the first embodiment is executed;

FIG. 5 is a first flowchart illustrating a control flow according to the embodiment of the present disclosure;

FIG. 6 is a second flowchart illustrating a control flow according to the embodiment of the present disclosure;

FIG. 7 is a graph illustrating the correlation between an output upper limit value and a battery temperature battery or a SOC amount;

FIG. 8 is a graph illustrating a driving request load and a vehicle speed when the internal combustion engine is started;

FIG. 9 is a graph illustrating the correlation between a prescribed ratio α and the battery temperature or the SOC amount;

FIG. 10A is a time chart illustrating the temporal transitions of a riding sensing flag, system power, a first-control complete flag, a start flag, supplied electric energy, and a vehicle speed when the battery temperature is a prescribed first temperature in the second embodiment;

FIG. 10B is a time chart illustrating the temporal transitions of the riding sensing flag, the system power, the first control complete flag, the start flag, the supplied electric energy, and the vehicle speed when the battery temperature is a second temperature in the second embodiment; and FIG. 11 is a time chart illustrating the temporal transitions of the riding sensing flag, the system power, the first control complete flag, the start flag, the supplied electric energy, and the vehicle speed when the battery temperature is the second temperature and when a prescribed ratio α is changed according to the battery temperature in the second embodiment.

DESCRIPTION OF EMBODIMENTS

In the following, specific embodiments of the present disclosure will be described with reference to the drawings. The dimensions, materials, shapes, relative arrangements, and other features of the components that will be described in connection with the embodiments are not intended to limit the technical scope of the present disclosure only to them, unless otherwise stated.

Embodiment 1

In the present embodiment, the present disclosure is applied to a hybrid vehicle including an internal combustion engine and motor generators.

<Configuration of Hybrid Vehicle>

FIG. 1 is a diagram illustrating the schematic configuration of a vehicle 100 according to the present embodiment. The vehicle 100 illustrated in FIG. 1 has an internal combustion engine 1, a first motor generator 19, and a second motor generator 20 as driving sources. Here, each of the first motor generator 19 and the second motor generator 20 is configured as a known alternating current synchronous motor that functions not only as a generator but also as a motor.

Besides the above configurations, the vehicle 100 has an electronic control unit (ECU) 10, a power split mechanism 12, a decelerator 16, a power control unit (PCU) 21, a battery 22, and the like as main structures. As illustrated in FIG. 1, the crank shaft of the internal combustion engine 1 is connected to an output shaft 13, and the output shaft 13 is connected to the power split mechanism 12. The power split mechanism 12 is coupled to the first motor generator 19 via a power transmission shaft 14 and also coupled to the second motor generator 20 via a power transmission shaft 15. Here, the power split mechanism 12 employs a known planetary gear mechanism (not illustrated) and splits and collects the mechanical power of the internal combustion engine 1, the first motor generator 19, and the second motor generator 20 to be transmitted. In addition, the decelerator 16 is connected to the power transmission shaft 15, and outputs from the driving sources are transmitted to a drive shaft 17 via the decelerator 16. The vehicle 100 is driven when drive wheels 18 connected to the drive shaft 17 are driven.

The PCU 21 is electrically connected to the first motor generator 19, the second motor generator 20, and the battery 22. Here, the PCU 21 includes an inverter not illustrated and is configured to be capable of converting DC power from the battery 22 into AC power and converting AC power generated by the first motor generator 19 and the second motor generator 20 into DC power. The PCU 21 may convert AC power generated by the first motor generator 19 and the second motor generator 20 into DC power and supply the DC power to the battery 22. In addition, the PCU 21 may convert DC power extracted from the battery 22 into AC power and supply the AC power to the first motor generator 19 and the second motor generator 20.

Here, the first motor generator 19 generates AC power when driven by the internal combustion engine 1 via the power split mechanism 12. The first motor generator 19 of this type will be called a "MG1" below. The second motor generator 20 may output shaft rotation to the power transmission shaft 15 to apply a driving force to the vehicle 100. In addition, the second motor generator 20 generates AC power when driven by the input of shaft rotation from the power transmission shaft 15 during the deceleration of the vehicle 100. The second motor generator 20 of this type will be called a "MG2" below.

The ECU 10 is an electronic control unit constituted by a CPU, a ROM, a RAM, a backup RAM, or the like. Various sensors (each not illustrated) such as a vehicle speed sensor that acquires a vehicle speed and a SOC sensor that acquires a state of charge (SOC) of the battery 22, specifically a charging amount (hereinafter also called a "SOC amount") of the battery 22 are connected to the ECU 10 via electric wiring, and their output signals are input to the ECU 10.

The ECU 10 grasps operating states or the like of the internal combustion engine 1, the MG1, the MG2, the battery 22, and the like based on the output signals of the various sensors, and normalizes a travel mode of the vehicle 100 based on the operating states. For example, when a driving request load for the vehicle 100 is relatively large, the ECU 10 causes the vehicle 100 to travel under a mode using the output of the internal combustion engine 1 and the output of the MG2 as driving sources. For example, when the SOC amount is relatively large and the driving request load for the vehicle 100 is relatively small, the ECU 10 causes the vehicle 100 to travel (perform EV travel) under a mode using only the output of the MG2 with the internal combustion engine 1 stopped. In the EV travel, only the output of the MG2 may serve as a driving source, or the outputs of the MG1 and the MG2 may serve as driving sources.

In addition, the vehicle 100 has a riding sensing unit 23. The riding sensing unit 23 turns on a riding sensing flag when it is assumed that an occupant rides in the vehicle 100. The riding sensing unit 23 may set the riding sensing flag based on an electric signal output from a known seating recognition sensor (seat sensor) or a seatbelt attachment sensor (each not illustrated) provided in a seat of the vehicle 100. Alternatively, the riding sensing unit 23 may be configured to be capable of communicating with a smart entry system that controls a locking/unlocking unit (not illustrated) of the vehicle. On this occasion, the riding sensing unit 23 may set the riding sensing flag after detecting the unlocking of the vehicle 100. Note that in the present embodiment, the riding sensing unit 23 corresponds to a sensing unit according to the present disclosure.

<Configuration of Internal Combustion Engine>

FIG. 2 is a diagram illustrating the schematic configuration of the internal combustion engine 1. The internal combustion engine 1 illustrated in FIG. 2 is a spark ignition internal combustion engine that is mounted in the vehicle 100 and operated using gasoline as fuel. The internal combustion engine 1 has a fuel injection valve 2 for supplying fuel into a cylinder not illustrated. The fuel injection valve 2 may be configured to directly inject the fuel into the cylinder, or may be configured to inject the fuel into a suction port.

The internal combustion engine 1 is connected to a suction path 3 for circulating fresh air (air) to be sucked in the cylinder. Halfway through the suction path 3, a throttle valve 30 that changes a cross-sectional area of the suction path 3 to adjust an amount of air to be sucked in the internal combustion engine 1 is provided. In addition, on the upstream side of the throttle valve 30 of the suction path 3, an airflow meter 31 for detecting an amount (mass) of fresh air (air) flowing through the suction path 3 is provided.

The internal combustion engine 1 is connected to an exhaust path 4 for circulating burned gas (exhaust) exhausted from the inside of the cylinder. A catalyst casing 400 is connected to an exhaust pipe 40 that constitutes the exhaust path 4. The catalyst casing 400 is configured in such a manner that a catalyst carrier carrying an exhaust purification catalyst is accommodated in a cylindrical casing. Note that two catalyst carriers are accommodated in the catalyst casing 400 in the present embodiment. A preceding catalyst on an upstream side is an electrically heated catalyst (hereinafter also called an "EHC"), and a subsequent catalyst on a downstream side is a three-way catalyst. The details of the catalysts will be described later. Further, on the exhaust path 4 on the upstream side of the catalyst casing 400, an air-fuel ratio sensor 41 that detects an air fuel ratio of gas flowing in the catalyst casing 400 is arranged. In addition, on the exhaust path 4 on the downstream side of the catalyst casing 400, an exhaust temperature sensor 42 that detects the temperature of gas flowing out from the catalyst casing 400 is arranged.

Besides the airflow meter 31, the air-fuel ratio sensor 41, and the exhaust temperature sensor 42, various sensors such as a crank position sensor 5 and an accelerator position sensor 6 are electrically connected to the ECU 10. Note that the crank position sensor 5 outputs an electric signal correlated with a rotation position of the output shaft (crank shaft) of the internal combustion engine 1. The accelerator position sensor 6 outputs an electric signal correlated with an operation amount (accelerator opening) of an accelerator pedal. The ECU 10 derives an engine rotation speed of the internal combustion engine 1 based on the output signal of the crank position sensor 5, and derives an engine load of the internal combustion engine 1 based on the output signal of the accelerator position sensor 6.

In addition, the ECU 10 is electrically connected to various equipments such as the fuel injection valve 2 and the throttle valve 30. The ECU 10 electrically controls the equipment based on the output signals of the various sensors.

Next, an exhaust purification unit having the above two exhaust purification catalysts will be described. FIG. 3 is a diagram illustrating the schematic configuration of the exhaust purification unit according to the present embodiment. The exhaust purification unit contains the EHC 410 and the subsequent catalyst 420.

The EHC 410 includes an EHC carrier 411, a mat member 412, and electrodes 413a and 413b. The EHC carrier 411 is accommodated in the catalyst casing 400. The EHC carrier 411 is formed in a column shape and provided so that its central axis is coaxial with a central axis A of the exhaust pipe 40. The central axis A is a central axis common to the exhaust pipe 40, the EHC carrier 411, and the catalyst casing 400. A three-way catalyst 411a is carried on the EHC carrier 411. Note that a catalyst carried on the EHC carrier 411 is not limited to a three-way catalyst. Instead, an oxidation catalyst, an occlusion reduction NOx catalyst, or a selective reduction NOx catalyst may be carried.

The EHC carrier 411 is made of a material that turns into electric resistance and generates heat when energized. As the material of the EHC carrier 411, SiC may be exemplified. The EHC carrier 411 has a plurality of paths which extend in a direction in which exhaust flows (i.e., in a direction in which the central axis A extends) and of which the cross section in a direction perpendicular to the direction in which the exhaust flows has a honeycomb shape. The exhaust flows through the paths. Note that the cross-sectional shape of the EHC carrier 411 in a direction orthogonal to the central axis A may be an ellipse or the like. In addition, in the present embodiment, the EHC carrier 411 corresponds to a heating element according to the present disclosure.

The pair of electrodes 413a and 413b is connected to the lateral surface (outer peripheral surface) of the EHC carrier 411. Each of the electrodes 413a and 413b extends in a circumferential direction and an axial direction along the outer peripheral surface of the EHC carrier 411. The electrodes 413a and 413b face each other across the EHC carrier 411. However, the respective entire surfaces of the electrodes 413a and 413b do not necessarily face each other. Metal foil 430 is connected to the electrodes 413a and 413b. The metal foil 430 protrudes outward from the catalyst casing 400 via a penetration hole 412a formed on the mat member 412 that will be described later and a penetration hole 400a formed on the catalyst casing 400. However, the penetration hole 400a of the catalyst casing 400 is surrounded by an electrode cover 440. Accordingly, the metal foil 430 protrudes inside the electrode cover 440. A power cable (not illustrated) is inserted into the electrode cover 440 in a sealed state. Further, the metal foil 430 is connected to the power cable inside the electrode cover 440. When the EHC carrier 411 is energized, a current flows from the battery 22 mentioned in the above description of the configurations of the hybrid vehicle to the electrodes 413a and 413b via the power cable and the metal foil 430. That is, the battery 22 supplies power to both the EHC carrier 411 and the above motors.

In the EHC 410, the three-way catalyst 411a carried on the EHC carrier 411 is heated when the EHC carrier 411 generates heat with energization. Thus, the activation of the three-way catalyst 411a is accelerated. Note that the supply of power to the EHC carrier 411 is controlled by the ECU 10 in the present embodiment. That is, the switching between the ON/OFF states of the energization of the EHC carrier 411 and the adjustment of power supplied to the EHC carrier 411 are performed by the ECU 10.

The catalyst casing 400 is made of metal. As the material of the catalyst casing 400, a stainless steel material may be exemplified. The inner wall surface of the catalyst casing 400 is coated with glass that is an electrical insulating material. Between the inner wall surface of the catalyst casing 400 and the outer peripheral surface of the EHC carrier 411, the mat member 412 is sandwiched. That is, the EHC carrier 411 is supported by the mat member 412 inside the catalyst casing 400.

The mat member 412 is made of an electrical insulating material. As the material of the mat member 412, ceramic fibers having alumina as its main component may be exemplified. The mat member 412 is wound on the outer peripheral surface of the EHC carrier 411. Since the mat member 412 is sandwiched between the EHC carrier 411 and the catalyst casing 400, the flow of a current to the catalyst casing 400 is prevented when the EHC carrier 411 is energized. That is, the mat member 412 has not only the function of supporting the EHC carrier 411 inside the catalyst casing 400 but also the function of electrically insulating the catalyst casing 400 and the EHC carrier 411 from each other.

Further, the subsequent catalyst 420 is accommodated inside the catalyst casing 400. The subsequent catalyst 420 is arranged on the downstream side of the EHC carrier 411 in the catalyst casing 400. A three-way catalyst 421*a* is carried on a catalyst carrier 421 of the subsequent catalyst 420. Note that a catalyst carried on the catalyst carrier 421 of the subsequent catalyst 420 is not also limited to a three-way catalyst. Instead, an oxidation catalyst, an occlusion reduction NOx catalyst, or a selective reduction NOx catalyst may be carried. In addition, between the catalyst carrier 421 of the subsequent catalyst 420 and the catalyst casing 400, a mat member 422 made of the same material as that of the mat member 412 is sandwiched. Thus, the catalyst carrier 421 is supported by the mat member 422 inside the catalyst casing 400.

<Energization Control>

Next, energization control for the EHC according to the present embodiment will be described. In the vehicle 100 according to the present embodiment, the battery 22 is charged by the driving force of the internal combustion engine 1 when the SOC amount becomes a first storage amount (hereinafter also called a "SOC1") or less. Specifically, AC power is generated when the MG1 is driven by the internal combustion engine 1 via the power split mechanism 12. Then, the generated AC power is converted into DC power by the PCU 21 and supplied to the battery 22. Here, if the internal combustion engine 1 is started to charge the battery 22 before the activation of an exhaust purification catalyst, there is a likelihood of emission being degraded. Therefore, in the present embodiment, the energization of the EHC carrier 411 of the EHC 410 is executed before the internal combustion engine 1 is started.

Specifically, when the riding of an occupant in the vehicle 100 is sensed by the riding sensing unit 23 and the SOC amount falls within a prescribed range, the ECU 10 controls the supply of power from the battery 22 to the EHC carrier 411 so that the power of electric energy of a prescribed ratio among electric energy (hereinafter also called "activation electric energy") required to activate the three-way catalyst 411*a* carried on the EHC carrier 411 is supplied to the EHC carrier 411. Hereinafter, the control will be called "first control." The control will be described in detail using a time chart below. Note that the ECU 10 functions as a controller according to the present disclosure by executing the first control.

FIG. 4 is the time chart illustrating the temporal transitions of a riding sensing flag, system power for driving the vehicle 100 (hereinafter also simply called "system power"), a first-control complete flag nflgcp, a start flag, a SOC amount, supplied electric energy from the battery 22 to the EHC carrier 411 (hereinafter simply also called "supplied electric energy"), and the speed (vehicle speed) of the vehicle 100 when the control according to the present embodiment is executed. Here, as described above, the riding sensing flag is a flag that is set to be turned on when it is assumed by the riding sensing unit 23 that an occupant has ridden in the vehicle 100. In addition, the first-control complete flag nflgcp is a flag that is set to be turned on when the first control is completed, and the start flag is a flag that is set to be turned on when the internal combustion engine 1 is started. Note that the start flag is also set to be turned on during the operation of the internal combustion engine 1. As illustrated in FIG. 4, the riding sensing flag is turned on at time t1, and the system power is turned on at time t3 in the present embodiment. After that, the EV travel of the vehicle 100 is started at time t4.

As illustrated in FIG. 4, the SOC amount falls within a range larger than a second storage amount (hereinafter also called a "SOC2") and smaller than a third storage amount (hereinafter also called a "SOC3") at the time t1 at which the riding sensing flag is turned on. Note that the range corresponds to the above prescribed range. Accordingly, the execution of the first control is started at the time t1.

Here, the SOC2 is a storage amount obtained by adding a prescribed margin to the SOC1. Accordingly, even if the SOC amount reduces down to the SOC2 during the execution of the first control and thus the execution of the first control is stopped, the SOC amount obtained by adding the prescribed margin to the SOC1 remains in the battery 22. Therefore, when the driving of the vehicle 100 is requested, the vehicle may perform EV travel using the SOC amount of the prescribed margin. In addition, power may be also supplied to the EHC carrier 411 using the SOC amount of the prescribed margin.

Further, the SOC3 is defined as a SOC amount enough to allow the three-way catalyst 411*a* to be activated even if the supply of power from the battery 22 to the EHC carrier 411 is started when the vehicle 100 performs EV travel.

Then, the supplied electric energy increases during the execution of the first control. At the time t2 at which the supplied electric energy reaches control target electric energy W1, the execution of the first control is completed, and the first control complete flag is turned on. Here, the control target electric energy W1 is electric energy of a prescribed ratio among activation electric energy W0. Note that the prescribed ratio is a value larger than 0% and smaller than 100% and is a fixed value (for example, 50%) in the present embodiment. In addition, the SOC amount decreases during the execution of the first control.

As illustrated in FIG. 4, the system power has not been turned on at the time t2. In this case, the vehicle 100 has a low probability of immediately traveling. In the control illustrated in FIG. 4, the system power is turned on at the time t3. However, the system power may not be turned on for a relatively long period after the energization of the EHC carrier 411 is executed. In this case, there is a likelihood that power supplied to the EHC carrier 411 at this time is wasted.

Therefore, the first control is executed so that the power of the control target electric energy W1 is supplied to the EHC carrier 411 as described above. Accordingly, even if a situation in which power consumption is wasted as described above occurs, wasted power consumption becomes smaller compared to a case in which the power of the activation electric energy W0 is supplied to the EHC carrier 411. In this case, it becomes possible to reduce power consumed to activate the three-way catalyst 411*a*.

In addition, in the present embodiment, the first control is not executed even if the riding of an occupant in the vehicle 100 is sensed when the SOC amount is the SOC3 or more before the system power is turned on. This also contributes to a reduction in the power consumed to activate the three-way catalyst 411*a*. This is because although it is possible to activate the three-way catalyst 411*a* without starting the internal combustion engine 1 by starting the energization of the EHC catalyst 411 during the EV travel of the vehicle 100 when the first control is executed in a state in which the SOC amount is the SOC3 or more, the energization of the EHC carrier 411 may be started before the EV travel of the vehicle 100 and power supplied to the EHC carrier 411 is wasted if the vehicle 100 does not travel afterwards.

However, the present embodiment is not limited to a mode in which the first control is executed when the SOC amount is larger than the SOC2 and smaller than the SOC3 at the time t1. The first control may be executed when the SOC amount is larger than the SOC2 at the time t1.

Further, in the present embodiment, the system power is not turned on until the time t3 after the execution of the first control is completed at the time t2. Therefore, the SOC amount does not change during this period. Then, the energization of the EHC carrier 411 is resumed when the system power is turned on at the time t3. In the energization of the EHC carrier 411 resumed at the time t3, the supply of power from the battery 22 to the EHC carrier 411 is controlled so that the power of electric energy obtained by subtracting the control target electric energy W1 from the activation electric energy W0 is supplied to the EHC carrier 411. The control will be called "second control" below.

Then, the supplied electric energy increases during the execution of the second control, and the execution of the second control is completed at time t5 at which the supplied electric energy reaches the activation electric energy W0. That is, the three-way catalyst 411a is activated at the time t5. In addition, as illustrated in FIG. 4, the EV travel of the vehicle 100 is started at the time t4. As a result, electric energy is supplied from the battery 22 not only to the EHC carrier 411 but also to the motors. Therefore, the SOC amount relatively largely reduces during the period between the time t4 and the time t5.

Then, when the SOC amount reduces down to the SOC1 (time t6), the start flag is turned on and the internal combustion engine 1 is started. The control illustrated in FIG. 4 is executed when a driving request load for the vehicle 100 falls within a load range in which the vehicle 100 is capable of performing EV travel, and the start flag is turned on when the SOC amount reduces down to the SOC1 as described above.

As described above, the energization of the EHC carrier 411 is started by the first control before the EV travel of the vehicle 100 is started in the present embodiment. Then, at the time t3 at which the system power is turned on and the second control is started, the power of the control target electric energy W1 has been already supplied to the EHC carrier 411. As a result, time for activating the three-way catalyst 411a is easily secured compared to a case in which the energization of the EHC carrier 411 is started during the EV travel of the vehicle 100. In the manner described above, a situation in which the internal combustion engine 1 is started before the activation of the three-way catalyst 411a is prevented as soon as possible, and thus emission caused when the internal combustion engine 1 is started may be reduced. In addition, when the time for activating the three-way catalyst 411a is secured, a situation in which the supplied electric energy per unit time to the EHC carrier 411 necessarily becomes excessive is prevented to increase the temperature of the EHC carrier 411 at an early stage. Therefore, the EHC carrier 411, the electrodes 413a and 413b, or the like is easily protected in the EHC 410.

Here, the internal combustion engine 1 is started when the SOC amount reduces down to the SOC1. Meanwhile, even if the battery 22 is requested to produce an output larger than a prescribed value, the internal combustion engine 1 is started. Specifically, even if the battery 22 is requested to produce an output larger than the upper limit value (output upper limit value) of power capable of being output per unit time by the battery 22, the battery 22 is not allowed to solely respond to the request. Therefore, the internal combustion engine 1 is started. In view of this, the internal combustion engine 1 is easily started when the battery 22 supplies power to both the EHC carrier 411 and the motors, compared to when the battery 22 supplies power only to the EHC carrier 411. This is because the battery 22 is requested to produce a large output when the battery 22 supplies power to both the EHC carrier 411 and the motors and the internal combustion engine 1 is started when the battery 22 is requested to produce an output larger than the output upper limit value.

Accordingly, in the present embodiment, the supplied electric energy (illustrated by Δw1/Δt in FIG. 4) per unit time in the first control is set to be larger than the supplied electric energy (illustrated by Δw2/Δt in FIG. 4) per unit time in the second control. Specifically, the supplied electric energy per unit time is made smaller in the second control in which the battery 22 is requested to produce a relatively large output and the internal combustion engine 1 is easily started, while the supplied electric energy per unit time is made larger in the first control in which the battery 22 is requested to produce a relatively small output and the internal combustion engine 1 is not easily started. Then, a situation in which the internal combustion engine 1 is started when the battery 22 is requested to produce an output larger than a prescribed value is prevented. Thus, a situation in which the internal combustion engine 1 is started before the activation of the three-way catalyst 411a may be suitably prevented. However, the present embodiment is not limited to this, and the supplied electric energy per unit time in the first control and the supplied electric energy per unit time in the second control may be the same.

Next, a control flow executed by the ECU 10 will be described based on FIGS. 5 and 6. FIGS. 5 and 6 are flowcharts illustrating the control flow according to the present embodiment. In the present embodiment, the flow is repeatedly executed by the ECU 10 at a prescribed calculation cycle.

In the flow, a determination is first made in S101 as to whether a catalyst activation flag has been turned off and a riding sensing flag has been turned on. As described above, the riding sensing flag is a flag set to be turned on when it is estimated by the riding sensing unit 23 that an occupant has ridden in the vehicle 100. The catalyst activation flag is a flag set to be turned on when it is estimated that the three-way catalyst 411a has been activated. The catalyst activation flag is set to be turned on by the processing of S120 that will be described later. Note that the catalyst activation flag is set to be turned off when it is estimated by known processing different from the flow that the three-way catalyst 411a has been inactivated. Then, the ECU 10 proceeds to the processing of S102 when the determination in S101 is affirmative, and the execution of the flow is completed when the determination in S101 is negative.

Next, when the determination in step S101 is affirmative, activation electric energy W0 is acquired in S102. In S102, the activation electric energy W0 may be acquired based on a known method. For example, the ECU 10 acquires the temperature of the EHC carrier 411 when the three-way catalyst 411a has been inactivated and the execution of the energization processing of the EHC carrier 411 has not been started, and may calculate the activation electric energy W0 based on the temperature. Note that the ECU 10 calculates the activation electric energy W0 in the manner described above and stores the value in a RAM. Until the catalyst activation flag is turned on in the processing of S120 that will be described later, the value of the activation electric energy W0 stored in the RAM is acquired in S102.

Then, in S103, a current amount SOCn of a SOC amount is acquired. In S103, the current amount SOCn may be acquired based on an output value of a SOC sensor.

Next, in S104, a determination is made as to whether a first control complete flag nflgcp has been set at 0. The first control complete flag nflgcp is a flag set at 1 (ON) when the first control is completed, and the value of the flag is set by the processing of S112 or S120 that will be described later. Then, the ECU 10 proceeds to the processing of S105 when the determination in S104 is affirmative or proceeds to the processing of S115 when the determination in S104 is negative.

When the determination in S104 is affirmative, a determination is next made in S105 as to whether the current amount SOCn acquired in S103 is larger than the SOC2 and smaller than the SOC3. Note that the SOC2 and the SOC3 are described above. Then, the ECU 10 proceeds to the processing of S106 when the determination in S105 is affirmative or proceeds to the processing of S113 when the processing in S105 is negative.

When the determination in S105 is affirmative, control target electric energy W1 is next calculated in S106. In S106, the control target electric energy W1 is calculated by the following formula 1.

$$W1 = W0 \times \alpha \qquad \text{formula 1}$$

W1: control target electric energy
W0: activation electric energy
α: prescribed ratio Here, the activation electric energy W0 is acquired by the processing of S102. The prescribed ratio α is any value larger than 0 and smaller than 1 and is, for example, 0.5. However, the prescribed ratio α is not limited to this. As will be described in detail in the following second embodiment, the prescribed ratio α may be changed according to a state of the battery 22.

Next, supplied electric energy Wsum is acquired in S107. The supplied electric energy Wsum is an integrated amount of power supplied from the battery 22 to the EHC carrier 411, and the ECU 10 may acquire the supplied electric energy Wsum based on a known technology. Thus, the temporal transition of the supplied electric energy as illustrated in FIG. 4 is stored in the RAM of the ECU 10.

Then, in S108, a determination is made as to whether the supplied electric energy Wsum acquired in S107 is smaller than the control target electric energy W1 calculated in S106. Then, the ECU 10 proceeds to the processing of S109 when the determination in S108 is affirmative or proceeds to the processing of S111 when the determination in S108 is negative.

When the determination in S108 is affirmative, the energization processing of the EHC carrier 411 is next executed in S109. Thus, the energization of the EHC carrier 411 may be started before the starting of the internal combustion engine 1. As a result, time for activating the three-way catalyst 411a is easily secured. Then, in S110, a first control execution flag nflgex is set at 1. The first control execution flag nflgex is a flag set at 1 during the execution of the first control. After the processing of S110, the execution of the flow is completed.

On the other hand, when the determination in S108 is negative, the energization processing of the EHC carrier 411 is next stopped at S111. When the determination in S108 is negative, the supplied electric energy of the EHC carrier 411 reaches the control target electric energy W1. Therefore, in this case, the energization processing of the EHC carrier 411 is stopped, and the execution of the first control is completed. Then, in S112, the first control execution flag nflgex is set at 0, and the first control complete flag nflgcp is set at 1. After the processing of S112, the execution of the flow is completed.

When the determination in S105 is negative, a determination is next made in S113 as to whether the first control execution flag nflgex has been set at 1. Here, if the first control is executed when the current amount SOCn acquired in S103 becomes the SOC2 or less, there is a likelihood that the SOC amount reduces down to the SOC1. As a result, the internal combustion engine 1 is started. In addition, if the first control is executed when the current amount SOCn acquired in S103 becomes the SOC3 or more, the above disadvantage may be caused.

Accordingly, when the determination in S113 is positive, i.e., when the first control has been executed, the energization processing of the EHC carrier 411 is next stopped in S114. That is, the execution of the first control is stopped. After the processing of S114, the execution of the flow is completed. On the other hand, when the determination in S113 is negative, i.e., when the first control has not been executed, the execution of the flow is completed.

As described above, according to the control flow illustrated in FIG. 5, the first control is executed so that the power of the control target electric energy W1 is supplied to the EHC carrier 411 when the riding sensing flag has been turned on and the SOC amount is larger than the SOC2 and smaller than the SOC3.

On the other hand, when the determination in S104 is negative, a determination is made in S115 as to whether system power for driving the vehicle 100 has been turned on. Then, when the determination in S115 is affirmative, the vehicle 100 has a high probability of relatively quickly traveling afterwards and thus the ECU 10 proceeds to the processing of S116. On the other hand, when the determination in S115 is negative, the vehicle 100 has a low probability of immediately traveling and thus the execution of the flow is completed.

When the determination in S115 is affirmative, supplied electric energy Wsum is next acquired in S116. The processing of S116 is substantially the same as the processing of S107.

Next, in S117, a determination is made as to whether the supplied electric energy Wsum acquired in S116 is smaller than the activation electric energy W0 acquired in S102. Then, the ECU 10 proceeds to the processing of S118 when the determination in S117 is affirmative or proceeds to the processing of S119 when the determination in S117 is negative.

When the determination in S117 is affirmative, the energization processing of the EHC carrier 411 is next executed in S118. After the processing of S118, the execution of the flow is completed.

On the other hand, when the determination in S117 is negative, the energization processing of the EHC carrier 411 is next stopped in S119. That is, in this case, it is assumed that the power of the activation electric energy W0 has been supplied to the EHC carrier 411 and the three-way catalyst 411a has been activated. Then, in S120, the catalyst activation flag is turned on, the supplied electric energy Wsum is reset, and the first control complete flag nflgcp is initialized to 0. After the processing of S120, the execution of the flow is completed.

As described above, according to the control flow illustrated in FIG. 6, the second control is executed so that the power of the electric energy obtained by subtracting the control target electric energy W1 from the activation electric energy W0 is supplied to the EHC carrier 411 when the execution of the first control is completed and the system power is turned on.

By the execution of the control described above, the ECU 10 may reduce emission during the starting of the internal combustion engine 1 while reducing powder consumed to active the three-way catalyst 411a. That is, both a reduction in emission and a reduction in power consumption are achieved.

Note that the three-way catalyst 411a is heated when the EHC carrier 411 generates heat with the reception of power from the battery 22 in the present embodiment, but the present embodiment is not limited to this. For example, the three-way catalyst 411a may be heated by an electrically heated wire that generates heat with the reception of power from the battery 22.

Second Embodiment

Next, a second embodiment of the present disclosure will be described based on FIGS. 7 to 11. Note that the detailed descriptions of substantially the same configurations and substantially the same control processing as those of the first embodiment will be omitted in the present embodiment.

In the first embodiment, the internal combustion engine 1 is started when the SOC amount reduces down to the SOC1 as mentioned in the description of FIG. 4. On the other hand, in the present embodiment, the internal combustion engine 1 is started when a driving request load for the vehicle 100 becomes larger than a prescribed load. Alternatively, the internal combustion engine 1 is started when the speed (vehicle speed) of the vehicle 100 becomes higher than a prescribed speed. For example, when the driving request load for the vehicle 100 is larger than a prescribed load, the driving request load is not satisfied even if the power of the upper limit value (hereinafter also called an "output upper limit value") of power capable of being output per unit time by the battery 22 is supplied to the motors. Therefore, in this case, the internal combustion engine 1 is started.

Here, the output upper limit value changes according to the temperature of the battery 22 or the SOC amount. The change in the output upper limit value will be described based on FIG. 7. FIG. 7 is a graph illustrating the correlation between the output upper limit value and the temperature (battery temperature) of the battery 22 or the SOC amount. In FIG. 7, a horizontal axis illustrates the battery temperature, and a vertical axis illustrates the output upper limit value. In addition, a line L1 illustrates the correlation between the output upper limit value and the battery temperature when the SOC amount is large, and a line L2 illustrates the correlation between the output upper limit value and the battery temperature when the SOC amount is small.

As illustrated in FIG. 7, the output upper limit value tends to be restricted to be lower when the battery temperature is low, compared to when the battery temperature is high. In addition, the output upper limit value tends to be restricted to be lower when the SOC amount is small, compared to when the SOC amount is large.

Further, the easiness of starting the internal combustion engine 1 changes since the output upper limit value changes according to the battery temperature or the SOC amount as described above. The easiness of starting the internal combustion engine 1 will be described based on FIG. 8. FIG. 8 is a graph illustrating a driving request load and a vehicle speed when the internal combustion engine 1 is started. In FIG. 8, a horizontal axis illustrates the vehicle speed, and a vertical axis illustrates the driving request load. In addition, a line L3 illustrates the starting condition of the internal combustion engine 1 when the battery temperature is an ordinary temperature and the SOC amount is large, a line L4 illustrates the starting condition of the internal combustion engine 1 when the battery temperature is the ordinary temperature and the SOC amount is small, and a line L5 illustrates the starting condition of the internal combustion engine 1 when the battery temperature is low and the SOC amount is small. For example, when the driving request load becomes a load illustrated by the line L5 or more at a certain vehicle speed, the internal combustion engine 1 is started. In addition, an area A1 illustrates a vehicle speed range and a driving request load range when the vehicle 100 travels in a prescribed driving mode.

As illustrated in FIG. 8, when the vehicle speed is the same at S0, the internal combustion engine 1 is most hardly started in a case in which the battery 22 is put into the state of the line L3 and is most easily started in a case in which the battery 22 is put into the state of the line L5. That is, when the vehicle speed is the same at the S0, the internal combustion engine 1 is easily started as the battery temperature is lower and is easily started as the SOC amount is smaller.

On the other hand, when the driving request load is the same at LD, the internal combustion engine 1 is most hardly started in a case in which the battery 22 is put into the state of the line L3 and is most easily started in a case in which the battery 22 is put into the state of the line L5. That is, when the driving request load is the same at the LD, the internal combustion engine 1 is easily started as the battery temperature is lower and is easily started as the SOC amount is smaller.

As a result, when the vehicle 100 is driven in a driving mode belonging to the area A1, the internal combustion engine 1 is not started in the case in which the battery 22 is put into the state of the line L3 and is started in the case in which the battery 22 is put into the state of the line L5. Then, if the first control mentioned in the first embodiment is executed without considering the fact that the easiness of starting the internal combustion engine 1 changes according to the state of the battery 22 as described above, a situation in which the internal combustion engine 1 is started before the activation of the three-way catalyst 411a may occur.

Therefore, according to the present embodiment, the prescribed ratio α mentioned in the first embodiment is changed according to the state of the battery 22. Specifically, the ECU 10 according to the present embodiment makes the prescribed ratio α larger to execute the first control when the battery temperature is low, compared to when the battery temperature is high. In addition, the ECU 10 makes the prescribed ratio α larger to execute the first control when the SOC amount is small, compared to when the SOC amount is large. FIG. 9 is a graph illustrating the correlation between the prescribed ratio α and the battery temperature or the SOC amount. In FIG. 9, a horizontal axis illustrates the battery temperature, and a vertical axis illustrates the prescribed ratio α. In addition, a line L6 illustrates the correlation between the prescribed ratio α and the battery temperature when the SOC amount is large, and a line L7 illustrates the correlation between the prescribed ratio α and the battery temperature when the SOC amount is small. As illustrated in FIG. 9, the ECU 10 according to the present embodiment makes the prescribed ratio α larger when the battery temperature is low compared to when the battery temperature is high, and makes the prescribed ratio α larger when the SOC amount is small compared to when the SOC amount is large. Thus, a situation in which the internal combustion engine 1 is started before the activation of the three-way catalyst 411*a* may be prevented as soon as possible. The prevention of the situation will be described in detail using a time chart below.

FIG. 10A is the time chart illustrating the temporal transitions of a riding sensing flag, system power, a first-control complete flag nflgcp, a start flag, supplied electric energy, and a vehicle speed when the battery temperature is a prescribed first temperature. As illustrated in FIG. 10A, the riding sensing flag is turned on at time t1, the system power is turned on at time t3. Afterwards, the vehicle 100 starts EV travel at time t4.

In control illustrated in FIG. 10A, the execution of the first control is completed when the supplied electric energy reaches control target electric energy W1 at time t2 like the control illustrated in FIG. 4. In addition, the execution of the second control is completed when the supplied electric energy reaches the activation electric energy W0 at time t5.

Here, in the control illustrated in FIG. 10A, the vehicle speed reaches S1 and the start flag is turned on at time t61 after the time t5 at which the execution of the second control is completed. That is, the internal combustion engine 1 is started at the time t61. Note that the vehicle speed S1 is a vehicle speed at which the internal combustion engine 1 is started when the battery temperature is a first temperature.

On the other hand, FIG. 10B is a time chart illustrating the temporal transitions of the riding sensing flag, the system power, the first control complete flag nflgcp, the start flag, the supplied electric energy, and the vehicle speed when the battery temperature is a second temperature lower than the first temperature. Note that the temporal transitions until time t4 in FIG. 10B are the same as the temporal transitions illustrated in FIG. 10A.

As described above, when the driving request load is the same, the internal combustion engine 1 is easily started as the battery temperature is lower. In addition, the second temperature is lower than the first temperature. Therefore, in FIG. 10B, the internal combustion engine 1 is started when the vehicle speed reaches a vehicle speed S2 lower than the vehicle speed S1 in FIG. 10A. Then, as illustrated in FIG. 10B, the vehicle speed reaches S2 and the internal combustion engine 1 is started at time t62 before time t5. At this time, the power of the activation electric energy W0 has not been supplied to the EHC carrier 411. That is, the internal combustion engine 1 is started before the activation of the three-way catalyst 411*a*.

Note that FIGS. 10A and 10B describe an example in which the vehicle speed at which the internal combustion engine 1 is started changes according to the battery temperature. However, as described above, the internal combustion engine 1 is easily started as the SOC amount is smaller when the driving request load is the same. Accordingly, when the vehicle speed at which the internal combustion engine 1 is started changes according to the SOC amount as well, the internal combustion engine 1 is possibly started before the activation of the three-way catalyst 411*a*.

Therefore, in the present embodiment, the prescribed ratio α is made larger when the battery temperature is low compared to when the battery temperature is high, and is made larger when the SOC amount is small compared to when the SOC amount is large. Here, FIG. 11 is a time chart illustrating the temporal transitions of the riding sensing flag, the system power, the first control complete flag nflgcp, the start flag, the supplied electric energy, and the vehicle speed when the battery temperature is the second temperature and when the prescribed ratio α is changed according to the battery temperature. Note that in FIG. 11, the internal combustion engine 1 is started when the vehicle speed reaches S2 like FIG. 10B.

Here, the battery temperature (second temperature) in FIG. 11 is lower than the battery temperature (first temperature) in FIG. 10A. Therefore, a prescribed ratio α2 in FIG. 11 is made larger than the prescribed ratio α1 in FIG. 10A. Here, the control target electric energy is calculated by the product of the activation electric energy W0 and the prescribed ratio α as mentioned in the description of the first embodiment. Accordingly, control target electric energy W11 (=W0×α2) in FIG. 11 is larger than the control target electric energy W1 (=W0×α1) in FIG. 10A.

As a result, in the control illustrated in FIG. 11, the execution of the first control is completed, and the first control complete flag is turned on at time t21 at which the supplied electric energy reaches the control target electric energy W11. Then, the execution of the second control is started at time t3, and is completed at time t51 at which the supplied electric energy reaches the activation electric energy W0. The time t51 is time earlier than the time t5 illustrated in FIGS. 10A and 10B. Further, the time t51 is time earlier than time t62 at which the vehicle speed reaches S2 and the internal combustion engine 1 is started. That is, in the control illustrated in FIG. 11, the power of the activation electric energy W0 is supplied to the EHC carrier 411 before the starting of the internal combustion engine 1, and thus a situation in which the internal combustion engine 1 is started before the activation of the three-way catalyst 411*a* is prevented.

On the other hand, according to the present embodiment, when the battery temperature is relatively high, that is, when time for activating the three-way catalyst 411*a* is easily secured, electric energy supplied to the EHC carrier 411 before the traveling of the vehicle 100 tends to be decreased. Accordingly, it becomes possible to reduce power consumed to activate the three-way catalyst 411*a*.

According to the present embodiment described above, both a reduction in emission and a reduction in power consumption may be achieved.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

What is claimed is:

1. An exhaust purification system for an internal combustion engine applied to a hybrid vehicle including the internal combustion engine and a motor and capable of performing electric vehicle (EV) travel to travel on a driving force of the motor with the internal combustion engine stopped, the hybrid vehicle performing the EV travel after system power for driving the hybrid vehicle is turned on, the exhaust purification system comprising:
an exhaust purification catalyst that is provided in an exhaust path of the internal combustion engine and purifies a prescribed component contained in exhaust of the internal combustion engine;
a heating element that is provided in the exhaust path and generates heat with reception of power to heat the exhaust purification catalyst;
a battery configured to supply the power to the motor and the heating element, wherein a state of charge (SOC) amount of the battery where the battery is requested to be charged by a driving force of the internal combustion engine is a first storage amount, and a second storage amount is a prescribed margin greater than the first storage amount;

a sensing unit configured to sense riding of an occupant in the hybrid vehicle; and a controller comprising at least one processor, the controller is configured to:

execute, in response to the SOC amount of the battery being greater than the second storage amount and the riding of the occupant is sensed by the sensing unit, first control to control the supply of the power from the battery to the heating element so that the power of electric energy of a prescribed ratio among activation electric energy, which represents electric energy required to activate the exhaust purification catalyst using the heating element, is supplied to the heating element, wherein, when a SOC amount of the battery enough to allow the exhaust purification catalyst to be activated even if the supply of the power from the battery to the heating element is started during the EV travel of the hybrid vehicle is a third storage amount, the controller executes the first control if the riding of the occupant is sensed by the sensing unit and the SOC amount of the battery is larger than the second storage amount and smaller than the third storage amount, and does not execute the first control if the riding of the occupant is sensed by the sensing unit and the SOC amount of the battery is the third storage amount or more.

2. The exhaust purification system for the internal combustion engine according to claim 1, wherein the controller is further configured to:

execute second control in which the supply of the power from the battery to the heating element is controlled so that power of electric energy obtained by subtracting electric energy supplied by the first control from the activation electric energy is supplied to the heating element when the execution of the first control is completed and the system power is turned on, wherein the controller makes supplied electric power per unit time in the first control larger than supplied electric power per unit time in the second control.

3. The exhaust purification system for the internal combustion engine according to claim 1, wherein the hybrid vehicle is a vehicle in which the internal combustion engine is started when a driving request load for the vehicle is larger than a prescribed load, the prescribed load being made smaller when the SOC amount of the battery is small compared to when the SOC amount of the battery is large, and the controller makes the prescribed ratio larger to execute the first control when the SOC amount of the battery is small compared to when the SOC amount of the battery is large.

4. The exhaust purification system for the internal combustion engine according to claim 3, wherein the controller is further configured to:

execute second control in which the supply of the power from the battery to the heating element is controlled so that power of electric energy obtained by subtracting electric energy supplied by the first control from the activation electric energy is supplied to the heating element when the execution of the first control is completed and the system power is turned on, wherein the controller makes supplied electric power per unit time in the first control larger than supplied electric power per unit time in the second control.

5. The exhaust purification system for the internal combustion engine according to claim 1, wherein the hybrid vehicle is a vehicle in which the internal combustion engine is started when a driving request load for the vehicle is larger than a prescribed load, the prescribed load being made smaller when a temperature of the battery is low compared to when the temperature of the battery is high, and the controller makes the prescribed ratio larger to execute the first control when the temperature of the battery is low compared to when the temperature of the battery is high.

6. The exhaust purification system for the internal combustion engine according to claim 5, wherein the controller is further configured to:

execute second control in which the supply of the power from the battery to the heating element is controlled so that power of electric energy obtained by subtracting electric energy supplied by the first control from the activation electric energy is supplied to the heating element when the execution of the first control is completed and the system power is turned on, wherein the controller makes supplied electric power per unit time in the first control larger than supplied electric power per unit time in the second control.

7. The exhaust purification system for the internal combustion engine according to claim 5, wherein the hybrid vehicle is a vehicle in which the internal combustion engine is started when a driving request load for the vehicle is larger than a prescribed load, the prescribed load being made smaller when the SOC amount of the battery is small compared to when the SOC amount of the battery is large, and the controller makes the prescribed ratio larger to execute the first control when the SOC amount of the battery is small compared to when the SOC amount of the battery is large.

8. The exhaust purification system for the internal combustion engine according to claim 7, wherein the controller is further configured to:

execute second control in which the supply of the power from the battery to the heating element is controlled so that power of electric energy obtained by subtracting electric energy supplied by the first control from the activation electric energy is supplied to the heating element when the execution of the first control is completed and the system power is turned on, wherein the controller makes supplied electric power per unit time in the first control larger than supplied electric power per unit time in the second control.

9. An exhaust purification system for an internal combustion engine applied to a hybrid vehicle including the internal combustion engine and a motor and capable of performing electric vehicle (EV) travel to travel on a driving force of the motor with the internal combustion engine stopped, the hybrid vehicle performing the EV travel after system power for driving the hybrid vehicle is turned on, the exhaust purification system comprising:

an exhaust purification catalyst that is provided in an exhaust path of the internal combustion engine and purifies a prescribed component contained in exhaust of the internal combustion engine;

a heating element that is provided in the exhaust path and generates heat with reception of power to heat the exhaust purification catalyst;

a battery configured to supply the power to the motor and the heating element, wherein a state of charge (SOC) amount of the battery where the battery is requested to be charged by a driving force of the internal combustion engine is a first storage amount, and a second storage amount is a prescribed margin greater than the first storage amount;

a sensing unit configured to sense riding of an occupant in the hybrid vehicle; and a controller comprising at least one processor, the controller is configured to:

execute, in response to the SOC amount of the battery being greater than the second storage amount and the riding of the occupant is sensed by the sensing unit, first control to control the supply of the power from the battery to the heating element so that the power of electric energy of a prescribed ratio among activation electric energy, which represents electric energy required to activate the exhaust purification catalyst using the heating element, is supplied to the heating element, wherein the hybrid vehicle is a vehicle in which the internal combustion engine is started when a driving request load for the vehicle is larger than a prescribed load, the prescribed load being made smaller when a temperature of the battery is low compared to when the temperature of the battery is high, and the controller makes the prescribed ratio larger to execute the first control when the temperature of the battery is low compared to when the temperature of the battery is high.

10. The exhaust purification system for the internal combustion engine according to claim 9, wherein the controller is further configured to:

execute second control in which the supply of the power from the battery to the heating element is controlled so that power of electric energy obtained by subtracting electric energy supplied by the first control from the activation electric energy is supplied to the heating element when the execution of the first control is completed and the system power is turned on, wherein the controller makes supplied electric power per unit time in the first control larger than supplied electric power per unit time in the second control.

11. The exhaust purification system for the internal combustion engine according to claim 9, wherein the hybrid vehicle is a vehicle in which the internal combustion engine is started when a driving request load for the vehicle is larger than a prescribed load, the prescribed load being made smaller when the SOC amount of the battery is small compared to when the SOC amount of the battery is large, and the controller makes the prescribed ratio larger to execute the first control when the SOC amount of the battery is small compared to when the SOC amount of the battery is large.

12. The exhaust purification system for the internal combustion engine according to claim 11, wherein the controller is further configured to:

execute second control in which the supply of the power from the battery to the heating element is controlled so that power of electric energy obtained by subtracting electric energy supplied by the first control from the activation electric energy is supplied to the heating element when the execution of the first control is completed and the system power is turned on, wherein the controller makes supplied electric power per unit time in the first control larger than supplied electric power per unit time in the second control.

13. An exhaust purification system for an internal combustion engine applied to a hybrid vehicle including the internal combustion engine and a motor and capable of performing electric vehicle (EV) travel to travel on a driving force of the motor with the internal combustion engine stopped, the hybrid vehicle performing the EV travel after system power for driving the hybrid vehicle is turned on, the exhaust purification system comprising:

an exhaust purification catalyst that is provided in an exhaust path of the internal combustion engine and purifies a prescribed component contained in exhaust of the internal combustion engine;

a heating element that is provided in the exhaust path and generates heat with reception of power to heat the exhaust purification catalyst;

a battery configured to supply the power to the motor and the heating element, wherein a state of charge (SOC) amount of the battery where the battery is requested to be charged by a driving force of the internal combustion engine is a first storage amount, and a second storage amount is a prescribed margin greater than the first storage amount;

a sensing unit configured to sense riding of an occupant in the hybrid vehicle; and a controller comprising at least one processor, the controller is configured to:

execute, in response to the SOC amount of the battery being greater than the second storage amount and the riding of the occupant is sensed by the sensing unit, first control to control the supply of the power from the battery to the heating element so that the power of electric energy of a prescribed ratio among activation electric energy, which represents electric energy required to activate the exhaust purification catalyst using the heating element, is supplied to the heating element, wherein the hybrid vehicle is a vehicle in which the internal combustion engine is started when a driving request load for the vehicle is larger than a prescribed load, the prescribed load being made smaller when the SOC amount of the battery is small compared to when the SOC of the battery is large, and the controller makes the prescribed ratio larger to execute the first control when the SOC amount of the battery is small compared to when the SOC amount of the battery is large.

14. The exhaust purification system for the internal combustion engine according to claim 13, wherein the controller is further configured to:

execute second control in which the supply of the power from the battery to the heating element is controlled so that power of electric energy obtained by subtracting electric energy supplied by the first control from the activation electric energy is supplied to the heating element when the execution of the first control is completed and the system power is turned on, wherein the controller makes supplied electric power per unit time in the first control larger than supplied electric power per unit time in the second control.

15. An exhaust purification system for an internal combustion engine applied to a hybrid vehicle including the internal combustion engine and a motor and capable of performing electric vehicle (EV) travel to travel on a driving force of the motor with the internal combustion engine stopped, the hybrid vehicle performing the EV travel after system power for driving the hybrid vehicle is turned on, the exhaust purification system comprising:

an exhaust purification catalyst that is provided in an exhaust path of the internal combustion engine and purifies a prescribed component contained in exhaust of the internal combustion engine;

a heating element that is provided in the exhaust path and generates heat with reception of power to heat the exhaust purification catalyst;

a battery configured to supply the power to the motor and the heating element, wherein a state of charge (SOC) amount of the battery where the battery is requested to be charged by a driving force of the internal combustion engine is a first storage amount, and a second storage amount is a prescribed margin greater than the first storage amount;

a sensing unit configured to sense riding of an occupant in the hybrid vehicle; and a controller comprising at least one processor, the controller is configured to:

execute, in response to the SOC amount of the battery being greater than the second storage amount and the riding of the occupant is sensed by the sensing unit, first control to control the supply of the power from the battery to the heating element so that the power of electric energy of a prescribed ratio among activation electric energy, which represents electric energy required to activate the exhaust purification catalyst using the heating element, is supplied to the heating element, wherein the controller is further configured to:

execute second control in which the supply of the power from the battery to the heating element is controlled so that power of electric energy obtained by subtracting electric energy supplied by the first control from the activation electric energy is supplied to the heating element when the execution of the first control is completed and the system power is turned on, wherein the controller makes supplied electric power per unit time in the first control larger than supplied electric power per unit time in the second control.

\* \* \* \* \*